(12) United States Patent
Kuang et al.

(10) Patent No.: US 11,070,340 B2
(45) Date of Patent: Jul. 20, 2021

(54) RESOURCE SHARING AMONG DIFFERENT OFDM NUMEROLOGIES

(71) Applicant: Panasonic Intellectual Property Corporation of America, Torrance (CA)

(72) Inventors: Quan Kuang, Frankfurt (DE); Hidetoshi Suzuki, Kanagawa (JP); Tetsuya Yamamoto, Kanagawa (JP); Lilei Wang, Beijing (CN); Alexander Golitschek Edler Von Elbwart, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 8 days.

(21) Appl. No.: 16/495,668

(22) PCT Filed: Mar. 24, 2017

(86) PCT No.: PCT/CN2017/077994
§ 371 (c)(1),
(2) Date: Sep. 19, 2019

(87) PCT Pub. No.: WO2018/170867
PCT Pub. Date: Sep. 27, 2018

(65) Prior Publication Data
US 2020/0092065 A1 Mar. 19, 2020

(51) Int. Cl.
*H04L 5/00* (2006.01)
*H04L 27/26* (2006.01)
*H04W 72/04* (2009.01)

(52) U.S. Cl.
CPC ............ *H04L 5/0053* (2013.01); *H04L 5/001* (2013.01); *H04L 5/0048* (2013.01);
(Continued)

(58) Field of Classification Search
CPC ..... H04L 5/0053; H04L 5/001; H04L 5/0048; H04L 5/0094; H04L 27/2602; H04L 27/2666; H04W 72/0453
See application file for complete search history.

(56) References Cited

U.S. PATENT DOCUMENTS

2016/0352551 A1* 12/2016 Zhang ............... H04L 27/26025
2016/0353476 A1* 12/2016 Sartori .................. H04L 5/0092
(Continued)

FOREIGN PATENT DOCUMENTS

| CN | 106376050 A | 2/2017 |
|----|-------------|--------|
| WO | 2016/130175 A1 | 8/2016 |
| WO | 2016/192644 A1 | 12/2016 |

OTHER PUBLICATIONS

3GPP TR 38.801 V2.0.0, "3rd Generation Partnership Project; Technical Specification Group Radio Access Network; Study on New Radio Access Technology; Radio Access Architecture and Interfaces (Release 14)," Mar. 2017, 90 pages.
(Continued)

*Primary Examiner* — Ajay Cattungal
(74) *Attorney, Agent, or Firm* — Seed IP Law Group LLP

(57) ABSTRACT

The present disclosure relates to a transmission device, a reception device, a transmission method and a reception method. The transmission device comprises circuitry which, in operation, maps data and/or a reference signal onto resources of a communication system. The resources include subcarriers of a first numerology and a second numerology, wherein the first numerology and the second numerology differ at least by subcarrier spacing. The subcarriers of the first and the second numerologies are frequency-multiplexed on a subcarrier basis. The transmission device further comprises a transmitter which, in operation, transmits the mapped reference signals and/or data. Therein, the circuitry, in operation, assigns no transmit power to at least one
(Continued)

subcarrier located between a subcarrier of the first numerology and a subcarrier of the second numerology.

18 Claims, 13 Drawing Sheets

(52) U.S. Cl.
CPC ........ *H04L 5/0094* (2013.01); *H04L 27/2602* (2013.01); *H04L 27/2666* (2013.01); *H04W 72/0453* (2013.01)

(56) References Cited

U.S. PATENT DOCUMENTS

| | | | | |
|---|---|---|---|---|
| 2018/0167151 | A1* | 6/2018 | Wang | H04B 17/318 |
| 2019/0013881 | A1* | 1/2019 | Olesen | H04W 16/14 |
| 2019/0173639 | A1* | 6/2019 | Tang | H04W 72/044 |
| 2019/0190687 | A1* | 6/2019 | Yi | H04L 5/18 |
| 2019/0253866 | A1* | 8/2019 | Abedini | H04B 7/0695 |
| 2020/0267731 | A1* | 8/2020 | Werner | H04W 72/042 |
| 2020/0295895 | A1* | 9/2020 | Wu | H04W 72/0413 |

OTHER PUBLICATIONS

3GPP TR 38.913 V14.1.0, "3rd Generation Partnership Project; Technical Specification Group Radio Access Network; Study on Scenarios and Requirements for Next Generation Access Technologies; (Release 14)," Dec. 2016, 38 pages.

International Search Report, dated Dec. 27, 2017, for corresponding International Application No. PCT/CN2017/077994, 2 pages.

Ericsson, "Mixed Numerology in an OFDM System," R1-165833, Agenda Item: 7.1.3.1, 3GPP TSG RAN WG1 Meeting #85, Nanjing, China, May 23-27, 2016, 9 pages.

Extended European Search Report, dated Sep. 29, 2020, for European Application No. 17901901.3, 11 pages.

Samsung, "Numerology for URLLC," R1-1609050, Agenda Item: 8.1.2.1, 3GPP TSG RAN WG1 Meeting #86bis, Lisbon, Portugal, Oct. 10-14, 2016, 4 pages.

ZTE, ZTE Microelectronics, "About RB Grid Definition and Handling Inter-numerology Interference in NR," R1-1608963, Agenda Item: 8.1.2.1, 3GPP TSG-RAN WG1 Meeting #86bis, Lisbon, Portugal, Oct. 10-14, 2016, 8 pages.

ZTE, ZTE Microelectronics, "Frequency multiplexing of different numerologies," R1-164273, Agenda Item: 7.1.4, 3GPP TSG RAN WG1 Meeting #85, Nanjing, China, May 23-27, 2016, 10 pages.

Iwabuchi et al., "Field Experimental Trial on Frequency-domain Multiplexing of Mixed Numerology to Accommodate Diverse Applications in 5G," *IEICE Technical Report* 116(396), pp. 129-134, Jan. 12, 2017 (7 pages; with English abstract).

Japanese Office Action, dated Dec. 1, 2020, for Japanese Application No. 2019-542682 (7 pages; with English translation).

* cited by examiner

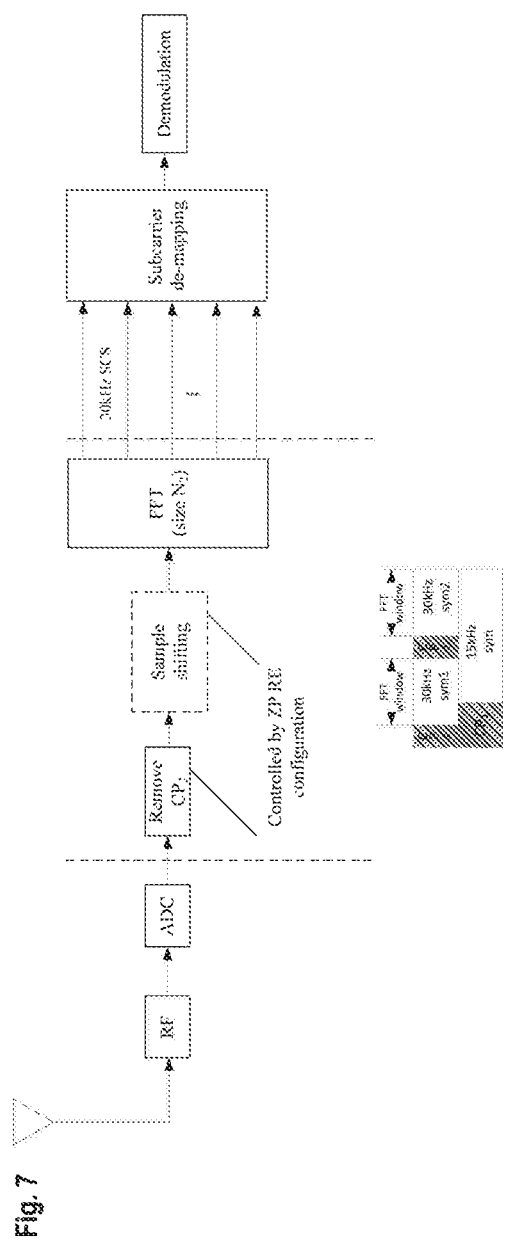
Fig. 7
Fig. 8
Fig. 9

RESOURCE SHARING AMONG DIFFERENT OFDM NUMEROLOGIES

BACKGROUND

Technical Field

The present disclosure relates to transmission and reception of data and/or reference signals in resources of a communication system including subcarriers with different subcarrier spacing.

Description of the Related Art

Currently, the $3^{rd}$ Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard.

One objective of 5G NR is to provide a single technical framework addressing all usage scenarios, requirements and deployment scenarios defined in 3GPP TSG RAN TR 38.913 v14.1.0, "Study on Scenarios and Requirements for Next Generation Access Technologies", December 2016 (available at www.3gpp.org and incorporated herein in its entirety by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

Another objective is the forward compatibility. The backward compatibility to the Long Term Evolution (LTE) is not required, which facilitates a completely new system design and/or the introduction of novel features.

As summarized in one of the technical reports for the NR study item (3GPP TSG TR 38.801 v2.0.0, "Study on New Radio Access Technology; Radio Access Architecture and Interfaces", March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to 40 GHz.

One of the design targets in NR is to seek the common waveform as much as possible for downlink, uplink and sidelink. It has been considered that introduction of the DFT spreading might not be needed for some cases of uplink transmission. The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

BRIEF SUMMARY

One non-limiting and exemplary embodiment facilitates providing coordination of the transmission of reference signals and the data for the mixed numerologies to reduce inter-numerology interference.

In one general aspect, the techniques disclosed here feature a transmission device. The transmission device comprises circuitry which, in operation, maps data and/or a reference signal onto resources of a communication system. The resources include subcarriers of a first numerology and a second numerology, wherein the first numerology and the second numerology differ at least by subcarrier spacing. The subcarriers of the first and the second numerologies are frequency-multiplexed on a subcarrier basis. The transmission device further comprises a transmitter which, in operation, transmits the mapped reference signals and/or data. Therein, the circuitry, in operation, allocates no transmit power to at least one subcarrier located between a subcarrier of the first numerology and a subcarrier of the second numerology.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 7 is a block diagram showing an exemplary reception device and illustrating its operation employing 30 kHz numerology;

FIG. 8 is a schematic drawing illustrating an FFT window applied at the receiver supporting 15 kHz numerology;

FIG. 9 is a schematic drawing illustrating an FFT window applied at the receiver supporting 30 kHz numerology;

DETAILED DESCRIPTION

As identified in TR 38.913, the various use cases/deployment scenarios for NR have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability. Finally, mMTC requires high connection density (1,000,000 devices/km$^2$ in an urban environment), large coverage in harsh environments, and extremely long-life battery for low cost devices (15 years).

Figure 1:
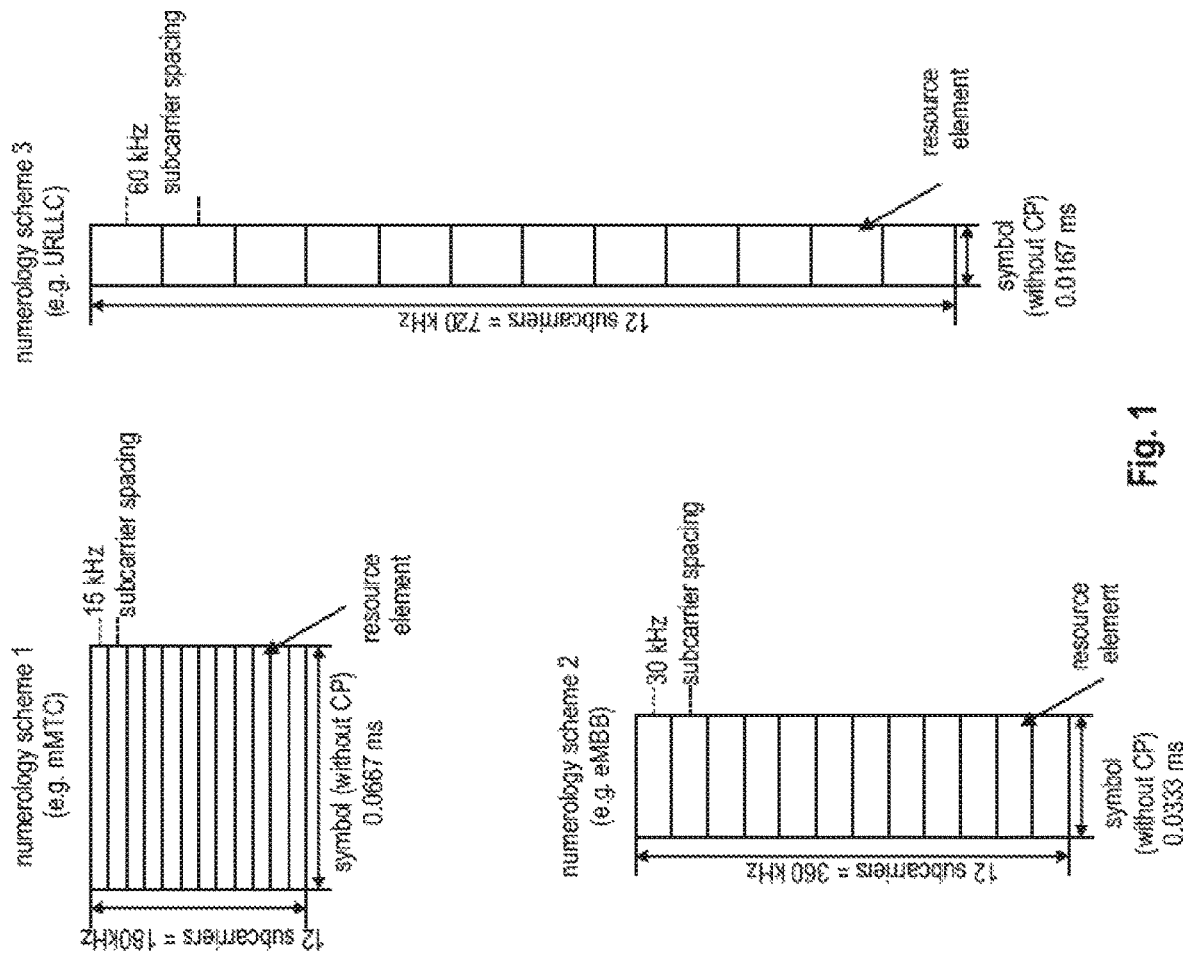
FIG. 1 is a schematic drawing illustrating different numerologies.

Therefore, multiple OFDM numerologies are supported in the NR network, each of which can be optimized to one service scenario. A numerology is defined by subcarrier spacing and CP overhead. It has been decided that the subcarrier spacing values in different numerologies are derived by scaling a basic subcarrier spacing by an integer N. In RAN1 #85 (Nanjing, May 2016), it was concluded as a working assumption that the LTE-based numerology including 15 kHz subcarrier spacing is the baseline design for the NR numerology. For the scaling factor N, it was concluded N=$2^m$ as the baseline design assumption. Correspondingly, subcarrier spacings of 15 kHz, 30 kHz, 60 kHz . . . are being considered. FIG. 1 illustrates three different subcarrier spacings (15 kHz, 30 kHz, and 60 kHz) and the corresponding symbol duration. The symbol duration $T_u$ and the subcarrier spacing $\Delta f$ are directly related through the formula $\Delta f=1/T_u$. In a similar manner as in the LTE systems, the term "resource element" (RE) is used to denote a minimum resource unit being composed of one subcarrier for the length of one OFDM or Single-Carrier (SC) Frequency Division Multiple Access (SC-FDMA) symbol.

In order to accommodate different services with diverse requirements, it has been decided that multiplexing different numerologies within a same NR carrier bandwidth (from the network perspective) is supported in TDM and/or FDM manner for both downlink and uplink. On the other hand, from a UE perspective, a UE may support one or more than one usage scenarios (e.g., an eMBB UE or a UE supporting both eMBB and URLLC). Generally speaking, supporting more than one numerology can complicate UE processing.

For subcarrier spacing of $2^m \times 15$ kHz, it has been decided that subcarriers are mapped on the subset/superset of those for subcarrier spacing of 15 kHz in a nested manner in the frequency domain and the physical resource block (PRB) grids are defined as the subset/superset of the PRB grid for subcarrier spacing of 15 kHz in a nested manner in the frequency domain.

Figure 2:
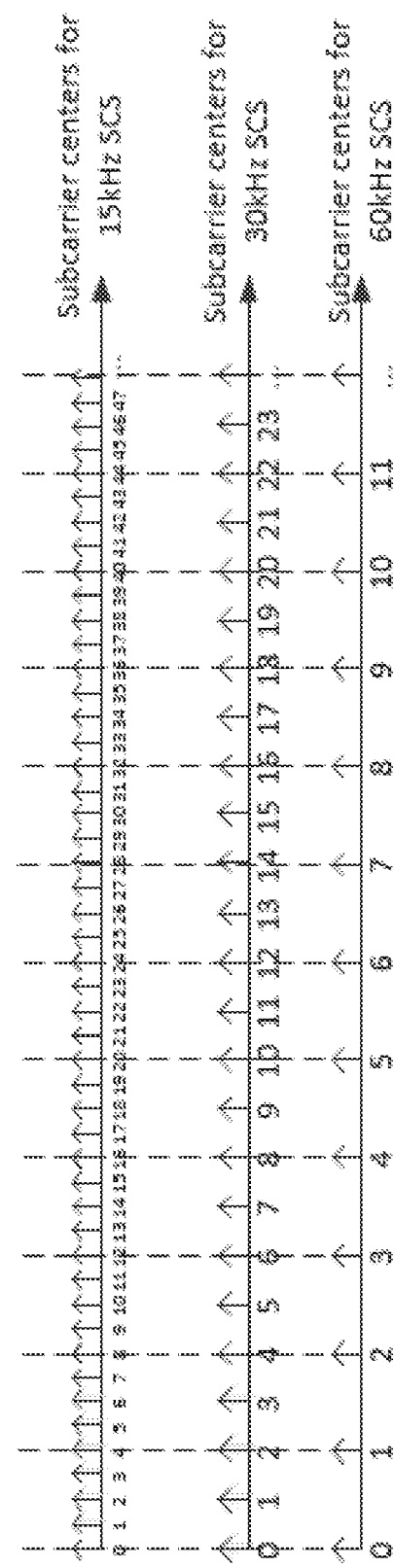
FIG. 2 is a schematic drawing illustrating the nested structure of subcarriers for different subcarrier spacings.

FIG. 2 illustrates one example of the nested structure of subcarriers for three subcarrier spacings: 15 kHz, 30 kHz, and 60 kHz.

If subcarriers in different numerologies are nested (as agreed in RAN1 #86), certain subcarriers in different numerologies are orthogonal across different numerologies. In the case of the nested structure of subcarriers as shown in FIG. 2, the following subcarriers are orthogonal across numerologies:

For the largest SCS $\Delta f_{max}$ (60 kHz), all subcarriers, i.e., k=0, 1, 2, . . . , are orthogonal across numerologies.

For SCS $\Delta f=\Delta f_{max}/N$, subcarriers with indices k×N where k is the subcarrier index for the largest SCS, are orthogonal across numerologies. In particular, for SCS $\Delta f$=30 Hz, subcarriers I=0, 2, 4, . . . , are orthogonal across numerologies. Further, for SCS $\Delta f$=15 Hz, subcarriers m=0, 4, 8, . . . , are orthogonal across numerologies.

In the case where subcarrier indexing bias is introduced for certain numerology with SCS $\Delta f=\Delta f_{max}/N$, the inter-numerology-orthogonal subcarrier is identified as k×N+bias. E.g., if 15 kHz-SCS subcarrier #1 is aligned with 60 kHz-SCS subcarrier #0 (meaning that indexing bias for 15 kHz-SCS numerology is one), then subcarriers I=1, 5, 9, . . . in 15 kHz-SCS are orthogonal across numerologies.

In 3GPP RAN1 #87, it has been agreed that NR strives for efficient support of dynamic resource allocation of different numerologies in FDM/TDM fashion (from network perspective). In order to support dynamic resource sharing, the scheduler should have the channel state information (CSI) over the shared resources with respect to different numerologies involved. In particular, each receiver measures the channel parameters and generates, based thereon, the CSI which is provided on a regular (synchronous and/or asynchronous) basis to the transmitter. In LTE and expectedly also in NR, the transmitter may have the role of scheduler and be implemented in a network node such as a base station. On the other hand, the receivers may be terminals (user equipment, UE) of any kind.

In LTE release 10 and above, CSI reference signal (CSI-RS) can be used for the UE to form CSI report which is then fed back to the scheduler. The CSI-RS is frequency-multiplexed with data carried in a Physical Downlink Shared Channel (PDSCH) in LTE. PDSCH is a physical channel for transmission in downlink direction, i.e., from a scheduling node (base station, eNB or gNB) to a UE. The term "shared" refers to the fact that the physical resources are allocated dynamically among a plurality of UEs, i.e., shared, based on the current traffic rather than connection based.

Since CSI-RS and PDSCH are transmitted using the same numerology, subcarriers carrying CSI-RS and PDSCH are orthogonal to each other. Therefore, there is no interference between CSI-RS and PDSCH within a cell.

Figure 3A:
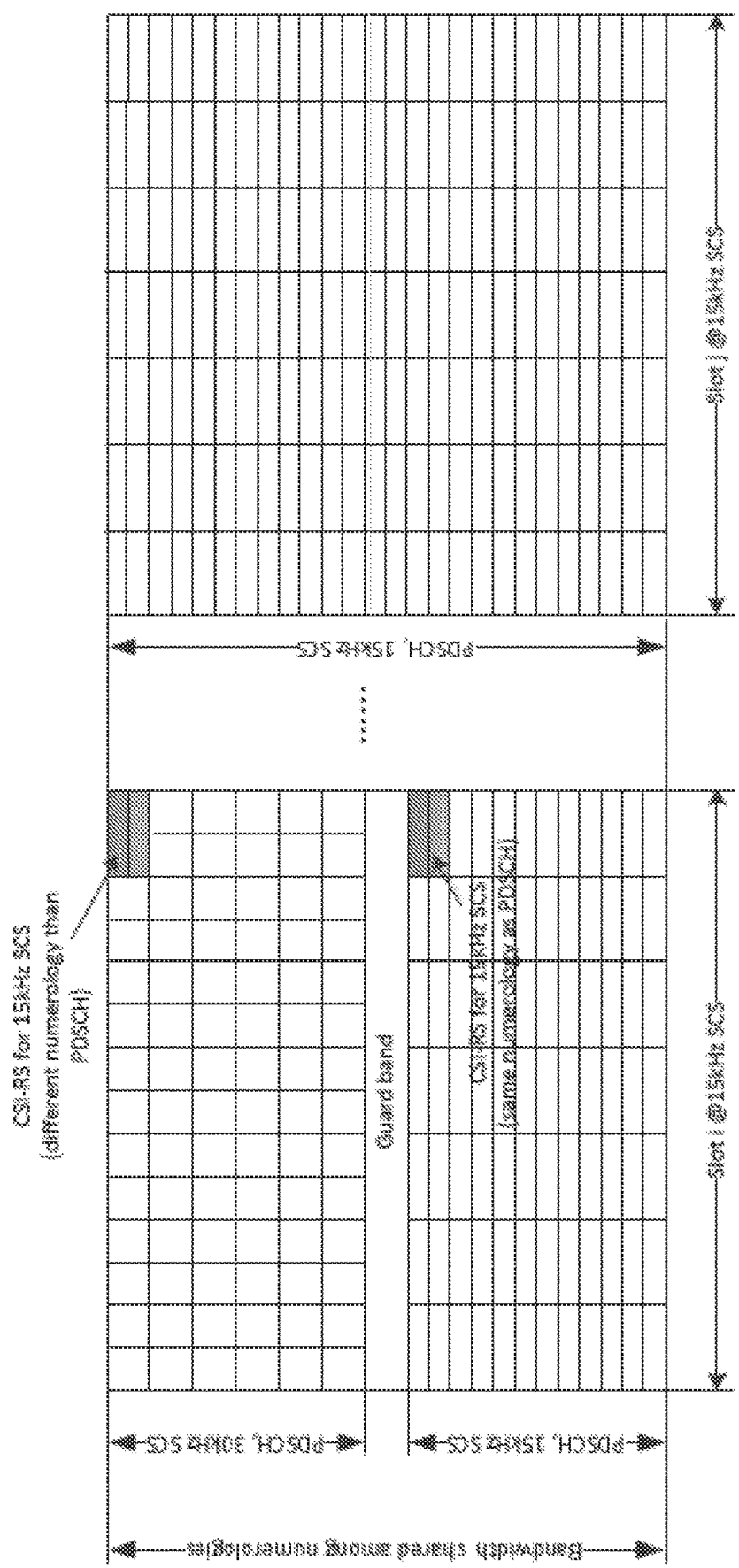
FIGS. 3A and 3B are a schematic drawings illustrating interference due to non-inter-numerology-orthogonal subcarriers.

For NR, it has been agreed that CSI-RS is supported for CSI acquisition. CSI report may need the measurements of both channel and inter-cell interference. In NR, however, it could happen that CSI-RS and PDSCH are transmitted using different numerologies, considering the fact that multiple numerologies coexist in the network. This will result in inter-numerology interference because the subcarriers belonging to different numerologies are not orthogonal in general. FIG. 3A illustrates one such example. Up to now, it remains unclear how to coordinate the transmission of CSI-RS and the PDSCH for the mixed numerologies to avoid inter-numerology interference. It is noted that, in general, the channel over which data are transmitted does not have to be PDSCH. This problem occurs for different co-existing numerologies irrespectively of the type of the channel. In general, any data channel carrying payload and/or control information may be concerned and the following exemplary embodiments are also applicable to any such channel.

Referring to FIG. 3A, in slot i, the bandwidth for PDSCH transmission is partitioned equally between 15 kHz-SCS numerology and 30 kHz-SCS numerology. However, the scheduler needs CSI from 15 kHz-SCS UEs over whole shared bandwidth in order to schedule 15 kHz-SCS UEs over a larger frequency bandwidth in slot j to accommodate an increased traffic. Therefore, in slot i, CSI-RS using 15 kHz SCS is transmitted over data (PDSCH) region of 30 kHz SCS, resulting inter-numerology interference. The inter-numerology interference will adversely impact the channel estimation quality due to the interference from PDSCH to CSI-RS, and the decoding of PDSCH due to the interference from CSI-RS to PDSCH.

Moreover, due to potential inter-numerology interference, the measurements of inter-cell interference will be less accurate (e.g., not reflecting the actual traffic situation in neighboring cells but rather a combination of the inter-cell interference and inter-numerology interference). It would be challenging for the scheduler to make scheduling decision based on this inaccurate CSI report.

The above description is from 15 kHz-SCS UE perspective. On the other hand, the scheduler also needs the channel state report from 30 kHz-SCS UEs in order to schedule these UEs. There are two options of choosing the numerology for CSI-RS transmission in this case.

Figure 6:
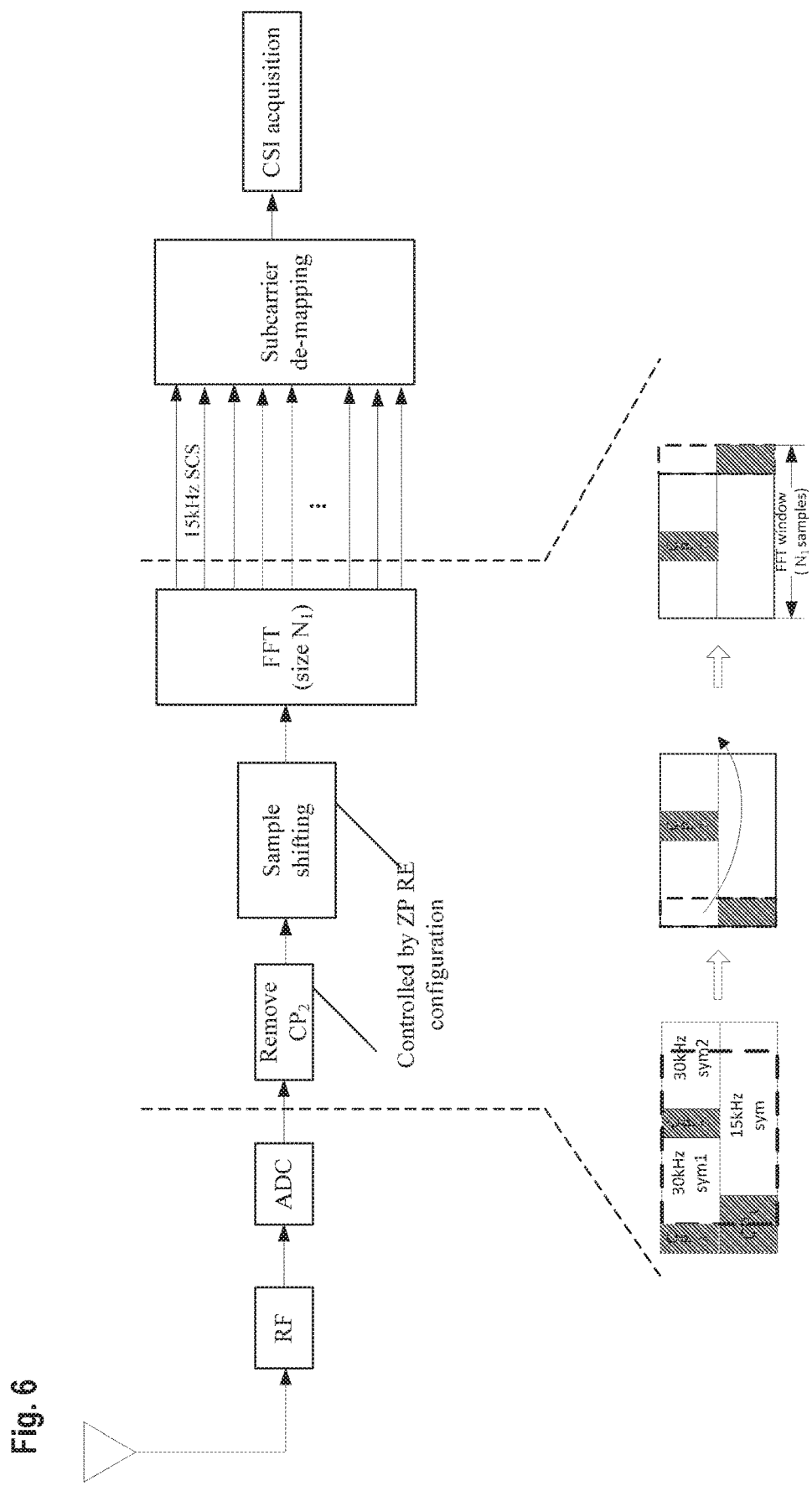
FIG. 6 is a block diagram showing an exemplary reception device and illustrating its operation employing 15 kHz numerology.

The first option is that a single numerology is used to transmit CSI-RS over the whole shared bandwidth. For example, 15 kHz SCS is used for transmitting CSI-RS over the PDSCH bandwidth shared by 15 kHz and 30 kHz SCSs, as shown in FIG. 3A. Then 30 kHz-SCS UEs can be configured to detect the CSI-RS using 15 kHz-SCS by, e.g., CSI configuration message. With this design, 15 kHz-SCS UEs can detect CSI-RS and decode data channel simultaneously with a single processing engine, however, 30 kHz-SCS UEs with a single processing engine may need to buffer the data first, and then perform CSI estimation and PDSCH decoding in serial, potentially causing extra delay for CSI reporting. Nevertheless, considering the total CSI reporting time, this extra delay would be negligible. On the other hand, if 30 kHz-SCS UEs are equipped with multiple processing engines, simultaneously detecting/decoding CSI-RS/data channel is possible. Note that processing engine here refers to the modules performing operations such as FFT operation. It may include CP removal, sample shifting, FFT modules and subcarrier de-mapping, as shown in FIG. 6 and FIG. 7.

Figure 3B:
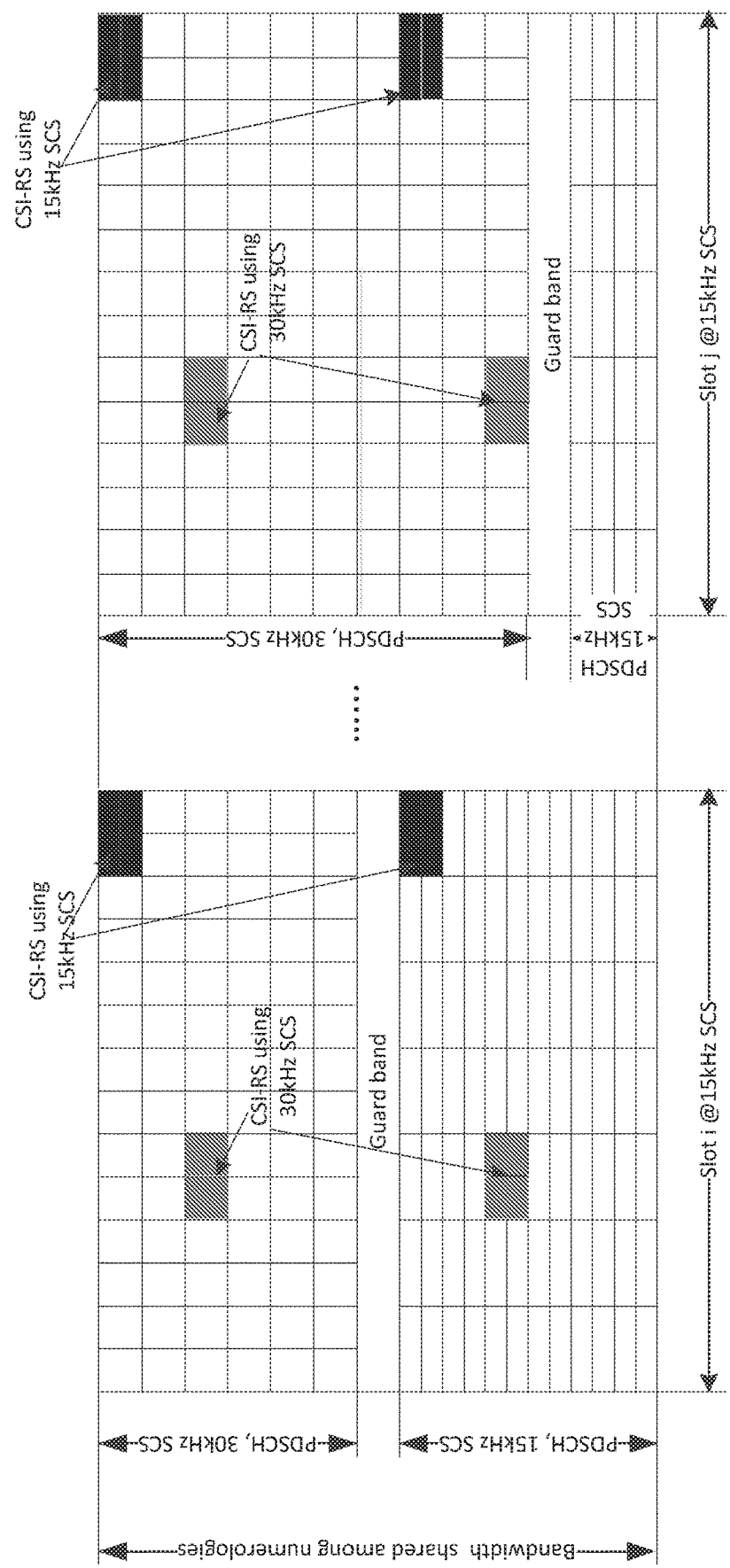

The second option is that multiple numerologies are used to transmit CSI-RS, each of which is over the whole shared bandwidth. FIG. 3B illustrates one such example, where CSI-RS is transmitted by both 15 kHz and 30 kHz SCSs. In such case, each UE detects the CSI-RS with the same numerology as data. Therefore, UEs are not required to handle different numerologies, however, the overhead of CSI-RS may increase from the network perspective, compared to the first option.

Irrespective to the used numerology or numerologies for CSI-RS, there is always a possibility that CSI-RS and the underlying PDSCH being transmitted by different numerologies, at least for periodic and semi-persistent CSI-RS transmission. This is because PDSCH with certain numerology can be dynamically scheduled per scheduling interval, or TTI, over the shared bandwidth, whereas periodic and semi-persistent CSI-RS resources are adapted on a slower timescale (e.g., every multiple of a TTI). Not allowing mixture of CSI-RS and PDSCH with different numerologies may largely restrict scheduling flexibility of used numerology (numerologies) of PDSCH. As a result, the problem of inter numerology interference occurs.

The current disclosure provides solutions to coordinate the transmission of reference signals (e.g., CSI-RS) and the data (e.g., carried by PDSCH) for the mixed numerologies to reduce inter-numerology interference.

Generally, the present disclosure provides devices and methods for the configuration of resource reservation by the network, where the reserved resources do not carry any transmission, i.e., zero power (ZP) is allocated.

In other words, a transmission device (or scheduler) allocates no transmit power to these reserved resources. Accordingly, when reference signals and data are respectively frequency-multiplexed with different numerologies at RE level, i.e., on a resource element basis, certain numbers of resource elements are reserved by the transmitting device for the zero power resource elements. In other words, no transmit power is allocated to certain resources. No physical channel or signal is transmitted over the ZP resource elements. Moreover, the configuration of zero power resources is numerology specific, i.e., different numerologies can have different configurations regarding the allocation of no transmit power.

Figure 4:
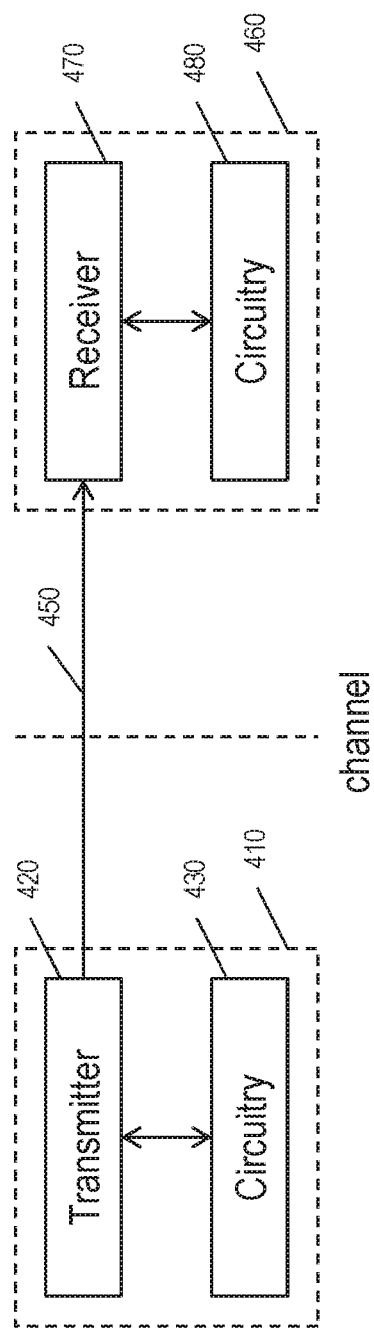
FIG. 4 is a block diagram showing structure of a transmission device and a reception device.

FIG. 4 illustrates a block diagram of a communication system including a transmitting device 410 and a reception device 460 communicating with each other over a (wireless) physical channel 450.

The transmission device 410 comprises circuitry 430 which, in operation, maps data and/or a reference signal onto resources of the communication system. The resources include subcarriers of a first numerology and a second numerology, wherein the first numerology and the second numerology differ at least by subcarrier spacing. The subcarriers of the first and the second numerologies are frequency-multiplexed on a subcarrier basis. The transmission device 410 further comprises a transmitter 420 which, in operation, transmits the mapped reference signals and/or data. The circuitry 430, in operation, assigns no transmit power to at least one subcarrier located between a subcarrier of the first numerology and a subcarrier of the second numerology.

The reception device 460 comprises a receiver 470, which, in operation, receives data and/or a reference signal in resources of the communication system. The reception device 460 further comprises circuitry 480, which, in operation, de-maps the data and/or the at least one reference signal from the resources which include subcarriers of a first numerology and subcarriers of a second numerology, wherein the first numerology and the second numerology differ at least by subcarrier spacing and the subcarriers of the first and the second numerologies are frequency-multiplexed on a subcarrier basis. The receiver 470, in operation, receives control information to derive to which subcarriers no transmit power is allocated, and no transmit power is allocated to at least one subcarrier located between a subcarrier of the first numerology and a subcarrier of the second numerology.

Also disclosed is a transmission method to be performed by a transmission device. The transmission method comprises the step of mapping data and/or a reference signal onto resources of a communication system, the resources including subcarriers of a first numerology and a second numerology, wherein the first numerology and the second numerology differ at least by subcarrier spacing and the subcarriers of the first and the second numerologies are frequency-multiplexed on a subcarrier basis. The transmission method further comprises the step of transmitting the mapped reference signal and/or data. In the step of transmitting the data and/or a reference signal onto the resources, no transmit power is assigned to at least one subcarrier located between a subcarrier of the first numerology and a subcarrier of the second numerology.

Further disclosed is a reception method to be performed by a reception device. The reception method comprises the step of receiving data and/or a reference signal in resources of a communication system. The reception method further comprises the step of de-mapping the data and/or the reference signal from the resources which include subcarriers of a first numerology and subcarriers of a second numerology, wherein the first numerology and the second numerology differ at least by subcarrier spacing and the subcarriers of the first and the second numerologies are frequency-multiplexed on a subcarrier basis. In the step of receiving data and/or control information, control information is received to derive to which subcarriers no transmit power is allocated, and no transmit power is allocated to at least one subcarrier located between a subcarrier of the first numerology and a subcarrier of the second numerology.

It is noted that the transmission device 410 can be embedded in a base station (scheduling node) and/or in a terminal (UE). Moreover, the reception device 460 may also be embedded in a base station and/or in a terminal.

In downlink operation, the base station operates as the transmission device 410. It may transmit the control information indicating the subcarriers to which zero power is to be assigned. Then, the base station may schedule data for a terminal and transmit the data and/or reference signals according to the configuration, i.e., allocates no transmission power to the subcarriers indicated by the configuration. The terminal which receives the data and/or reference signals, may measure the channel and/or inter-cell interference based on the reference signals and provide CSI report back to the base station.

In uplink operation, the base station operates as the reception device 460. It may transmit the control information indicating the subcarriers to which zero power is to be assigned. Then, the base station may schedule transmission from a terminal by providing the terminal with an uplink resource allocation information. The terminal then transmits the data and/or reference signals according to the configuration, i.e., assigns no transmission power to the subcarriers indicated by the configuration. The base station which receives the data and/or reference signals, may measure the channel and/or inter-cell interference based on the reference signals and employ it for scheduling.

If data and a reference signal are assigned to resource elements to be transmitted and/or received, the data may be mapped to the subcarriers of one of the first and second numerologies, and the reference signal may be mapped onto the respective numerology of the first and second numerologies other than the numerology to which the data are mapped.

The term "data" above refers to control data and/or payload. The term "reference signal" denotes a signal which is known to both the transmission and reception device. For instance, the location and the value (of at least one parameter) of the reference signal may be specified in standard or configured. The communication system may be a cellular system with a wireless interface. Such cellular system may also be mobile, i.e., supporting seamless mobility of the transmitting/receiving devices. The data may, for example, be transmitted/received on the PDSCH of such a cellular system. Furthermore, an example of a reference signal is a channel state information reference signal (CSI-RS). However, the present disclosure is not limited thereto but rather applicable to transmission/reception of any communication system.

Different types of CSI-RS include non-zero-power (NZP) CSI-RS, and zero-power (ZP) CSI-RS, to which no transmit power is allocated. A zero-power CSI-RS is configured for the measurement of inter-cell interference measurement. In the current disclosure, ZP CSI-RS are distinguished from "zero-power resource elements", which are resource elements to which no transmit power is allocated either. However, in general, ZP REs are not configured for any measurement. In an exemplary embodiment of the current disclosure, the circuitry 430 of the transmission device 410 maps one or more ZP CSI-RS onto subcarriers of the first and/or second numerology.

Figure 17:
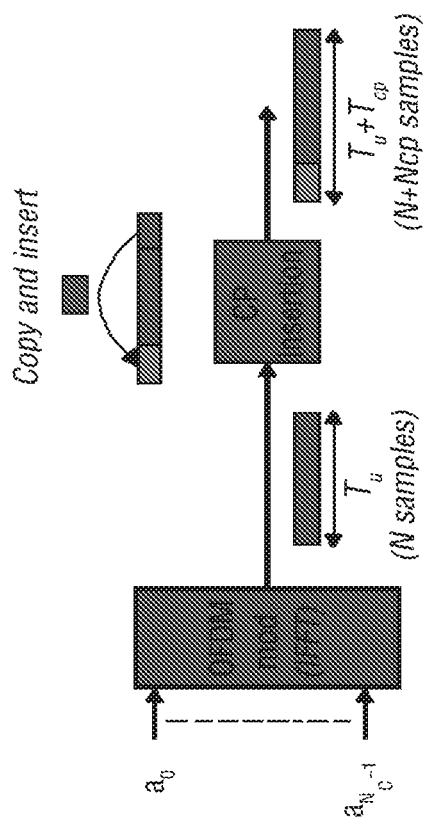
FIG. 17 is a schematic drawing illustrating addition of a cyclic prefix.

The resources may be based on the subcarriers of an OFDM system. Such resources may be defined by a subcarrier in frequency domain and a symbol in time domain such as an OFDM symbol. Resource defined by one subcarrier and one symbol is called as resource element (RE), which is the smallest physical resource in the system. A numerology may be defined not only by SCS but also by the cyclic prefix (CP) length. A OFDM symbol duration in time domain consists of a useful symbol time $T_u$ and the cyclic prefix length $T_{CP}$, where $T_u$ is directly related to the subcarrier spacing $\Delta f$ through the formula $\Delta f = 1/T_u$ and $T_{CP}$ can be chosen according to the time dispersion characteristics of the radio channel. In practice, CP insertion is carried out on the time-discrete output of the transmitter IFFT, as shown in FIG. 17. CP insertion implies that the last $N_{CP}$ samples of the IFFT output block of length N are copied and inserted at the beginning of the block, increasing the block length from N to $N+N_{CP}$. At the receiver side, the corresponding samples are discarded before OFDM demodulation by means of, for example, DFT/FFT processing. In particular, before performing the DFT/FFT, a window is applied to cut out the appropriate number of samples to be transformed as is also illustrated in FIGS. 8 and 9.

In a wireless communication system, the transmission device may correspond to a base station. Examples for such a base station are the eNodeB of LTE, or the gNodeB (gNB) of NR. The reception device may correspond to a terminal or user equipment (UE).

Different numerologies may be used for the transmission of reference signals and for data. For example the numerology of 15 kHz SCS is used for reference signal transmission and the numerology of 30 kHz SCS is used for data transmission. In the following, the operation of a transmitter according to this exemplary embodiment is described with respect to FIG. 5.

A scheduler firstly decides onto which subcarrier(s) the reference signal, the data, and the zero-power subcarriers should be mapped, respectively. Then the transmitting device performs the subcarrier mapping based on the decision. If the transmitting device and the scheduler are co-located, e.g., if in the downlink the transmitting device and scheduler are located inside the base station, no over-air signaling is needed. Otherwise, e.g., in the uplink, the scheduler's decision should be known to the transmission device, either implicitly or via explicit signaling. One such signaling method could use the downlink control information.

The location of the reference signal/zero-power/data resource elements within the resource grid above is decided by the scheduler. However, this is not to limit the present disclosure. The location may be also fully or partially defined by the standard. For instance, the standard may define one or more configurations of reference signal and/or ZP resource elements for each particular numerology. The scheduler may then select one of the possible configurations. Moreover, the schedule performs allocation of data resources to various UEs and the corresponding mapping of data onto the remaining resources which are not reserves for the reference signals and ZP.

Figure 5:
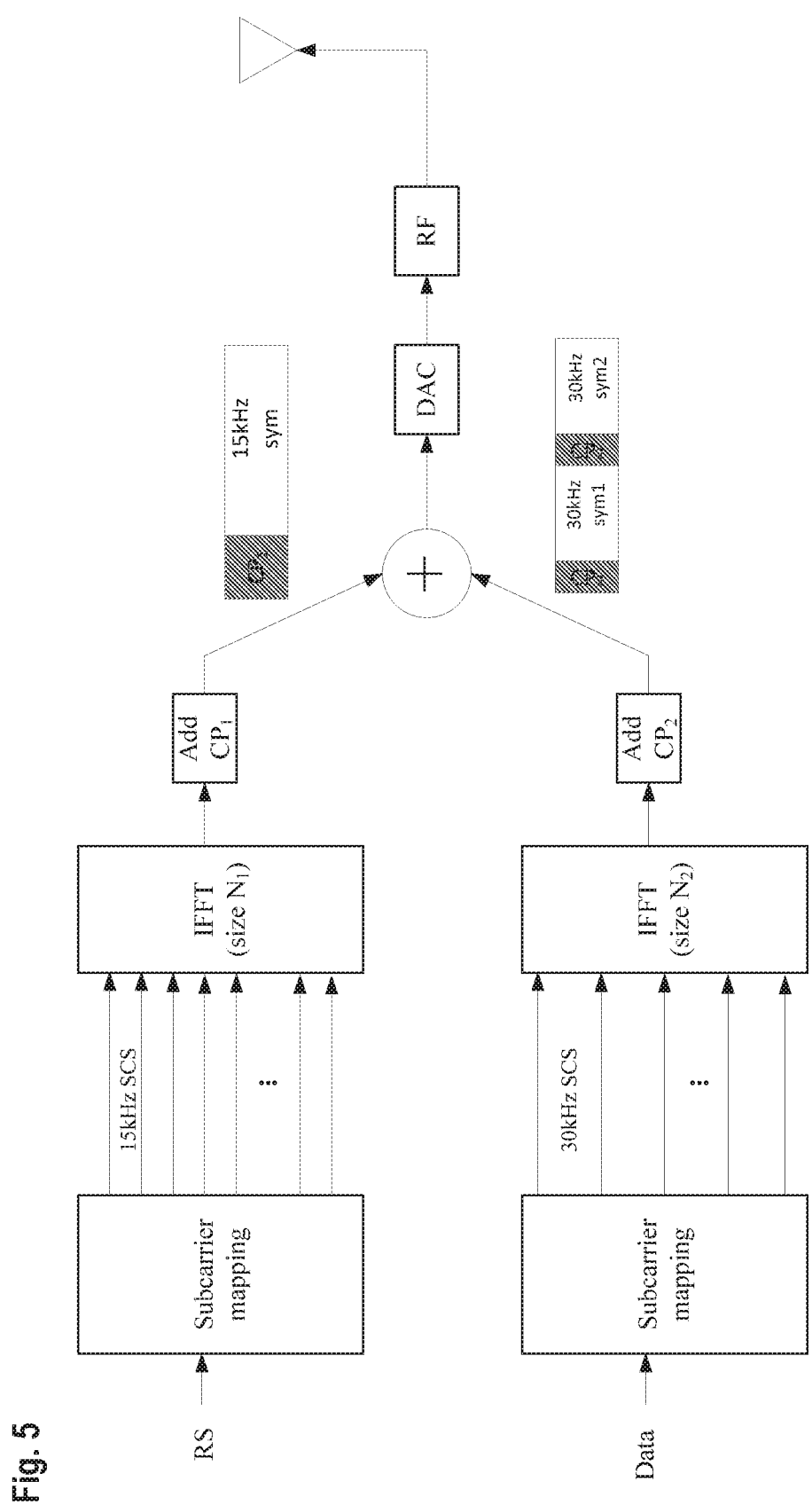
FIG. 5 is a block diagram showing an exemplary transmission device and illustrating its operation.

Referring to FIG. 5, a reference signal (RS) is mapped onto the subcarriers with 15 kHz SCS, which are configured for the RS transmission. Data are mapped onto the subcarriers with 30 kHZ SCS. As shown in FIG. 5, the subcarrier mapping may be performed by a subcarrier mapper which may be part of the circuitry 430 described above.

After the reference signal and data have been mapped to subcarriers, inverse fast Fourier transformation (IFFT) operation with different respective numbers of subcarriers (sizes $N_1$ and $N_2$) is performed. The sizes are chosen in the way to maintain the same sampling rate for different numerologies. E.g., for the numerology with 15 kHz SCS, $N_1$ can be chosen to be 2048, resulting the sampling rate of 30.72 MHz, which is a typical sampling rate in LTE system with 15 MHz or larger system bandwidth. The sampling rate is calculated as the product of SCS and IFFT size. Therefore, for the numerology with 30 kHz SCS, $N_2$ can be chosen to be 1024 (=$N_1$/2), resulting in the same sampling rate of 30.72 MHz. The IFFT block may also be a part of the circuitry 430.

Once the time domain samples have been generated by the IFFT block, cyclic prefix is added by the CP adder (also part of the circuitry 430). Different numerologies can have different respective CP lengths. To maintain the same CP overhead for different numerologies, CP length can be scaled by the same scaling factor of the subcarrier spacing. For example, for 15 kHz SCS 144 samples ($\approx$4.7 µs with the sampling rate of 30.72 MHz) are taken to form the $CP_1$, and for 30 kHz SCS 72 (=144/2) samples ($\approx$2.35 µs with the sampling rate of 30.72 MHz) are used for $CP_2$. Because the OFDM symbol time of 30 kHz SCS is a half of that of 15 kHz SCS, the CP overhead in percentage is the same for these two numerologies. However, the scaling relation of the CP length is not a prerequisite for the proposed scheme to work. The method disclosed here can be applied to arbitrary CP relations between numerologies.

In general, a transformation other than FFT/IFFT may be used such as discrete cosine transformation (DCT)/IDCT or any other transformation between time and frequency domain.

The next steps of the transmitting method, which may be performed by the transmission device, include adding together the time domain samples with the respective CPs from different numerologies, and then converting the obtained samples to the analog signal by the Digital-to-Analog Converter (DAC) module, and finally converting the signal to Radio Frequency (RF) that is then emitted via one or more antenna(s). The transmission device's circuitry 430 may thus include a numerology adder and the transmitter 420 may include the DAC as well as the RF circuitry (module) and the one or more antenna(s).

FIG. 6 shows an exemplary structure of the reception device 460. In particular, the receiver 470 may include one or more antennas, an RF circuitry (module) and an Analog-to-Digital Converter (ADC). The circuitry 480 may include circuitry for removing the CP, shift register, circuitry for performing FFT (FFT module) and subcarrier de-mapper.

Referring to FIG. 6, in the following, the operation of the receiving device 460 is described in detail. In particular, the receiving device is a 15 kHz-SCS receiving device which supports 15 kHz-SCS operation. Such a reception device may, but does not necessarily have to support other numerologies. Correspondingly, in FIG. 6, only the circuitry relevant for the 15 kHz-SCS reception is shown. At first, the analog signal is received via an antenna, and the RF module and converted into the digital signal, i.e., into time-domain samples.

Before the FFT operation, two steps may be performed in order to ensure that the inter-numerology interference from the 30 kHz SCS signal is reduced or even eliminated: CP removal, and sample shifting after the CP removal. The CP removal is based on the smaller CP length of the other, 30 kHz, numerology with larger SCS, e.g., in this example, the length of $CP_2$. After the $CP_2$ has been removed, the remaining samples in the $CP_1$ region can be shifted back to the end of the OFDM symbol. This sample-shifting operation is used to cancel the effect of phase shift that has been introduced to the received signal by cutting only part of the $CP_1$ out.

It is part of the zero power RE configuration that the length of CP to be removed and whether the sample-shifting operation is needed after CP removal. This configuration is known to the reception device either implicitly or by explicit signaling.

On the other hand, the scheduler can decide that as an example, 15 kHz-SCS reception device performs CP removal according to $CP_1$. In this case, no sample-shifting operation is needed. This is similar to the UE operation in current LTE system. No signaling to inform the existence of other CP lengths for other numerologies is needed for the receiver in this case. Certainly, this operation cannot guarantee that there is no interference from other numerologies, if other numerologies are using a different CP length than $CP_1$. Nevertheless, the scheduler can opt for this configuration in order to reduce the signaling overhead and the reception device's processing.

In general, the receiver may have the ability to configure and perform the CP removal according to other length than its native numerology and sample-shifting operation. Here, the term "native numerology" denotes the numerology in which the data are received. A receiving device may support a single one numerology or may support more than one numerology, of which any is selectable for data reception.

Finally, the receiving device de-maps the subcarriers and performs channel estimation and interference estimation by measuring the reference signal subcarriers. This may be performed by the CSI acquisition circuitry, which may also be part of the receiving device's circuitry 480.

In this example, the 30 kHz-SCS numerology has a smaller CP length among the mixed numerologies. Therefore, the 30 kHz-SCS receiver can perform CP removal according to its own numerology and omit the sample-shifting operation, as shown in FIG. 7.

In particular, FIG. 7 illustrates an example of a receiving device which received data in the 30 kHz numerology as for example those transmitted by the transmitting device of FIG. 5.

Nevertheless, as mentioned before, the 30 kHz-SCS receiver should be able to configure and perform the CP removal according to other length than its native numerology and sample-shifting operation as well, in order to, e.g., deal with other numerology mixing case. One such case would be that 15 kHz SCS, 30 kHz SCS, and 60 kHz SCS coexist in the received signal. Accordingly, the receiving device shown on FIG. 7 may also include the sample shifting circuitry (shift register). However, it is noted that a receiving device may be also capable of receiving only one numerology while still profiting from the reduced inter-numerology interference.

In FIG. 7, the 30 kHz-SCS numerology is used to carry data. Therefore, after the subcarriers are de-mapped at the receiver, demodulation is performed over the data subcarriers by the receiver to obtain the data transmitted. Correspondingly, the circuitry 480 of the receiving device 460 may further include demodulator for performing the demodulation of the data. The demodulation may be the demodulation according to the modulation applied at the transmitter such as QPSK, 16QAM, 32 QAM, 64QAM or the like as employed also in the LTE. However, the present disclosure is not limited thereto and higher-order QAM modulations may also be applied as well as any other modulations including BPSK, trellis-coded modulations, difference modulations or the like.

The above example assumes that reference signal and data are targeted at different receivers. However, it could happen that they are intended to the same receiver, although different numerologies are used. In such case, the receiver can have multiple FFT chains to perform the individual operation of the CP removal, sample shifting, FFT, subcarrier de-mapping, and CSI acquisition or demodulation, as shown in FIGS. 6 and 7. These multiple FFT chains (processing paths) can share a common RF module and a common ADC module, i.e., a common receiver 470. The processing of a receiving device supporting a numerology with 15 kHz SCS is reprinted in FIG. 8. The processing of a receiving device supporting a numerology with 30 kHz SCS is reprinted in FIG. 9.

According to an example, the circuitry assigns no transmission power to any subcarriers located between two adjacent subcarriers of the numerology with the greatest subcarrier spacing (among the co-existing numerologies).

Some embodiments above allow transmitting data and/or reference signals to reception devices, e.g., a power saving reception device such as certain sensors, which support transmission only on subcarriers of one numerology, e.g., with 15 kHz SCS or another type device with only 60 kHz SCS. Accordingly, the transmission device 410 is still able to transmit mapped data on subcarriers of numerologies having, for example, 60 kHz SCS and/or 30 kHz SCS to reception devices different from the reception device supporting only one numerology. In the above example, the named subcarrier spacings are interchangeable, i.e., a reception device may also support only a numerology with 30 kHz SCS.

For instance, as shown in FIG. 2, three numerologies may co-exist in a cell. Then, in order to suppress the inter-numerology interference, all non-inter-numerology-orthogonal subcarriers of numerologies with SCS 15 kHz and 30 kHz are muted, i.e., all the subcarriers located between the subcarriers centrally aligned with the subcarriers of the 60 kHz numerology.

However, in general, reduction of the inter-numerology interference may already be achieved, if only some of these carriers are muted. Accordingly, in presence of more than two different numerologies, the circuitry 430 of the transmission device 410 may assign no transmit power to subcarriers located between two adjacent subcarriers of the numerology with the greatest subcarrier spacing, which are centrally aligned with each other and belong to respective numerologies with subcarrier spacings smaller than the greatest subcarrier spacing.

It is noted that any of the above described embodiments and examples may be extended to more than two co-existing numerologies.

Moreover, the circuitry 430 of the transmission device 410 of FIG. 4 may generate control information indicating to which subcarriers no transmit power is allocated, and transmitter 420, in operation, transmits the generated control information. Further, said control information may be mapped onto a RE in a symbol in the time domain which precedes the symbol in which no transmit power is allocated to said subcarrier. The control information may specify at least one subcarrier to which:

no transmit power is allocated;
the reference signal is allocated; or
non-zero power can be allocated.

The control information may be transmitted via semi-static signaling, in particular system information. The control information may further be transmitted via dynamic signaling indicating activation or deactivation of a particular ZP configuration for a numerology.

Inter-Numerology-Orthogonality

As explained above with respect to FIG. 2, when nested subcarriers of different numerologies are used, certain subcarriers of different numerologies are orthogonal across numerologies. Furthermore, subcarriers are said to be inter-numerology-orthogonal if the following condition applies: If and only if these subcarriers are used for transmission by one numerology, the signal carried by these subcarriers can be received without interference by using another numerology.

For instance, the first numerology may have a SCS of 60 kHz, and the second numerology may have a SCS of 15 kHz. The transmitting device may then transmit an OFDM symbol by modulating the inter-numerology-orthogonal subcarriers of the numerology having the 15 kHz subcarrier spacing, namely the #0, #4, #8, . . . subcarriers, following the subcarrier numbering of FIG. 2. At the receiver side, demodulating the symbol by using 60 kHz SCS can recover the exact transmitted data over the subcarriers of 15 kHz SCS without having inter-numerology interference.

However, if, any one or multiple non-inter-numerology-orthogonal subcarrier(s), e.g., subcarrier #1, of the numerology having the 15 kHz SCS is modulated, it will produce interference to all subcarriers of the 60 kHz SCS when the transmitted signal is detected by 60 kHz SCS. In the said example, the subcarriers #0 and #1 in 60 kHz SCS which are closest to subcarrier #1 in 15 kHz will then be largely affected by inter-numerology interference generated by subcarrier #1 in 15 kHz SCS.

However, the present disclosure is not limited to the SCS of the first numerology being 60 kHz and the subcarrier spacing of the second numerology being 15 kHz. In the case of other mixed numerologies, the first numerology can be defined as the numerology with larger SCS if two SCSs are mixed, or the largest SCS if more than two SCSs are mixed.

In case that the subcarrier spacing of the first numerology is 60 kHz, the subcarrier spacing of the second numerology may also be 30 kHz. Furthermore, depending on the numerologies mixed, numerologies having respective subcarrier spacings of 30 kHz and 15 kHz may be used. Alternatively or in addition, the subcarrier spacing of the first numerology may be, larger than 60 kHz, e.g., 120 kHz. Moreover, numerologies having nested subcarrier spacings of 10 kHz, 20 kHz, 40 kHz, and 80 kHz may be used.

Accordingly, two numerologies can be chosen in a way that the subcarriers of the first numerology are orthogonal to each other. The subcarriers of the second numerology comprise inter-numerology-orthogonal subcarriers and non-inter-numerology-orthogonal subcarriers. As shown in FIG. 2, each subcarrier of the inter-orthogonal subcarriers of the second numerology is centrally aligned with a subcarrier of the first numerology. In other words, inter-numerology orthogonal subcarriers of the second numerology each are collocated with a subcarrier of the first numerology. The non-inter-orthogonal subcarriers are not centrally aligned with any subcarrier of the first numerology and located between two adjacent subcarriers of the first numerology. For instance, if the first and second numerologies are 60 kHz SCS and 30 kHz SCS, respectively, the subcarriers #0, #2, #4, . . . of the 30 kHz SCS are respectively centrally aligned with the subcarriers #0, #1, #2, . . . of the first numerology. On the other hand, subcarriers #1, #3, #5 of the second numerology are not centrally aligned with any subcarrier of the first numerology, although typically, within each numerology, the subcarriers are orthogonal to each other.

The two centrally aligned subcarriers themselves could interfere with each other if both are modulated by non-zero power. E.g., in FIG. 2, subcarrier #2 of the numerology with 30 kHz SCS will interfere with subcarrier #1 of the numerology with 60 kHz SCS if both are used for transmission. However, said subcarrier #2 of the numerology with 30 kHz SCS will not interfere with any other subcarrier of the numerology with 60 kHz SCS. Therefore, in this disclosure the centrally aligned subcarriers from different numerologies are called "inter-numerology-orthogonal" subcarriers with the understanding that as long as only one of the collocated subcarriers are allocated non-zero power there will be no interference between any two non-collocated subcarriers regardless of the numerology that the subcarriers belong to.

In the following, the interference of subcarriers having a smaller subcarrier spacing to subcarriers having a larger subcarrier spacing will be explained. As an example, numerologies with subcarrier spacings 15 kHz and 30 kHz will be regarded.

The time domain OFDM signal $s(t)$, $t=0 \sim N_c-1$ (without CP), is given by $$s(t) = \frac{1}{\sqrt{N_c}} \sum_{k=0}^{N_c-1} D(k) \exp\left(j 2\pi k \frac{t}{N_c}\right) \quad (1)$$

wherein the data symbols are expressed as $D(k)$, $k=0, 1, \ldots, N_c-1$, where $N_c$ is the FFT size for 15 kHz SCS and, at the same time, number of subcarriers to form OFDM symbol. To evaluate the interference from 15 kHz subcarriers to 30 kHz subcarriers, assuming the CP has been added and then removed, e.g., according to FIG. 7, the first $N_c/2-1$ samples in time domain are taken and then converted to frequency domain signal by $(N_c/2-1)$-point FFT by $$S(i) = \frac{1}{\sqrt{N_c/2}} \sum_{t=0}^{N_c/2-1} s(t) \exp\left(-j 2\pi i \frac{t}{N_c/2}\right). \quad (2)$$

Above, k is an index for subcarriers corresponding to 15 kHz SCS and i is an index for subcarriers corresponding to 30 kHz SCS. Eq. (2) can be written as $$\begin{aligned} S(i) &= \frac{1}{\sqrt{N_c/2}} \sum_{t=0}^{N_c/2-1} \frac{1}{\sqrt{N_c}} \sum_{k=0}^{N-1} D(k) \exp\left(j 2\pi k \frac{t}{N_c}\right) \exp\left(-j 2\pi i \frac{t}{N_c/2}\right) \\ &= \frac{1}{\sqrt{N_c/2}} \frac{1}{\sqrt{N_c}} \sum_{k=0}^{N-1} D(k) \sum_{t=0}^{N_c/2-1} \exp\left(j 2\pi k \frac{t}{N_c}\right) \exp\left(-j 2\pi i \frac{t}{N_c/2}\right) \\ &= \frac{1}{\sqrt{N_c/2}} \frac{1}{\sqrt{N_c}} \sum_{k=0}^{N-1} D(k) \exp\left[j \pi \left(\frac{N_c}{2}-1\right)\left(\frac{k}{N_c}-\frac{2i}{N_c}\right)\right] F(k, i), \end{aligned} \quad (3)$$

where $$F(k, i) = \begin{cases} \dfrac{N_c}{2} & \text{if } k = 2i \\ \dfrac{\sin\pi\dfrac{N_c}{2}\left(\dfrac{k}{N_c}-\dfrac{2i}{N_c}\right)}{\sin\pi\left(\dfrac{k}{N_c}-\dfrac{2i}{N_c}\right)} & \text{otherwise} \end{cases} \quad (4)$$

Figure 10A:
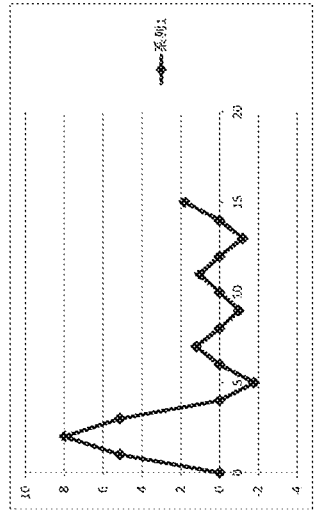
FIGS. 10A-10C are schematic drawings illustrating inter-numerology interference.
Figure 10B:
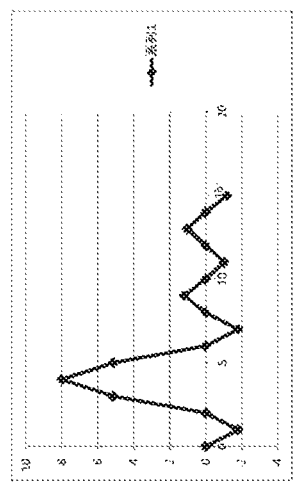
Figure 10C:
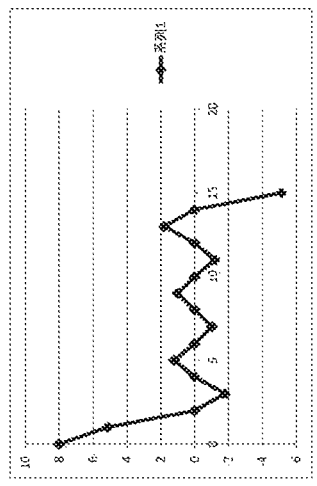

As examples for F(k,i), plots of F(k, 0), F(k, 1), and F(k, 2) for $N_c=16$ are respectively shown in FIGS. 10A to 10C.

As can be seen, the subcarriers $k=2\times i$ of 15 kHz SCS do not interfere with any subcarrier in 30 kHz SCS. Therefore, those subcarriers are defined as inter-numerology-orthogonal subcarriers. On the other hand, the figures show that other subcarriers with indices $k \neq 2\times i$ generate interference to subcarriers of 30 kHz SCS.

In an exemplary embodiment, the subcarriers of the first numerology may be orthogonal to each other. The subcarriers of the second numerology may comprise inter-numerology-orthogonal subcarriers, each of which is centrally aligned with a subcarrier of the first numerology, and non-inter-numerology-orthogonal subcarriers not centrally aligned with any subcarrier of the first numerology and located between two adjacent subcarriers of the first numerology. Then, the circuitry 430, may allocate no transmit power to at least one of the non-inter-numerology-orthogonal subcarriers. For instance, the circuitry 430 of the transmission device 410 may assign or allocate no transmit power to any of the non-inter-numerology-orthogonal subcarriers between two adjacent subcarriers of the first numerology to be transmitted to and received by a reception device. Accordingly, within a certain frequency range, all subcarriers except the "internal-numerology-orthogonal subcarriers" may be muted, i.e., reserved for zero power transmission. For the OFDM symbol where the reference signal is transmitted, the mapping of data to subcarriers is known to the scheduled reception device.

For instance, the reception device aimed for channel state information (CSI) reporting can be configured with non-zero-power (NZP) over the inter-numerology-orthogonal subcarriers for channel measurement. Moreover, the reception device aimed for CSI reporting can be configured with one or more zero power CSI reference signals distributed over the inter-numerology-orthogonal subcarriers for inter-cell interference measurement.

Within a certain frequency range, all subcarriers except the inter-numerology-orthogonal subcarriers may be reserved. For the OFDM symbol where CSI-RS is transmitted, the mapping of PDSCH to subcarriers should be known to the scheduled terminal.

The frequency range, over which the non-inter-numerology-orthogonal subcarriers are muted, depends on how strong the inter-numerology interference is expected, if there is a large difference in transmit power between numerologies, resources with no power transmission should be configured over a larger frequency range to protect the transmission with lower power from inter-numerology interference. On the other hand, if inter-cell interference is dominant and the inter-numerology interference has less impact, zero power transmission can be configured within a smaller frequency range.

As mentioned above, the configuration of the ZP resource elements (e.g., their location in the resource grid) may be selected (decided) by a network node such as base station and signaled to the receivers. In particular, the signaling may be implicit or explicit. For instance, the network may signal to the terminal(s) configuration of coexisting numerologies. Based on these signaled numerologies supported, a particular configuration of the ZP resource elements is determined. On the other hand, it may be desirable to provide different configurations even for the same numerology mixing scenarios, in which case an explicit signaling may be advantageous.

For instance, a plurality of configurations may be predefined in a standard. In particular, there may be one or more configuration for each of supported numerologies. Defining a plurality of configurations per numerology enables covering of different combinations of mixed numerologies.

Exemplary configurations may be defined as follows:

Configuration 1: for 15 kHZ SCS mute subcarriers #1, #3, #5 . . . (all subcarriers with an odd index, assuming indexing as shown in FIG. 2). This configuration enables efficient mixing with 30 kHz SCS numerology.

Configuration 2: for 15 kHZ SCS mute subcarriers #1, #2, #3, #5, #6, #7, #9, #10, #11 . . . (all non-inter-numerology-orthogonal subcarriers suitable when mixing with 60 kHz SCS numerology).

The implicit indication may then be provided by signaling the coexisting numerologies and imply deriving of configuration 1 if 15 kHz and 30 kHz numerologies coexist in the cell and deriving of configuration 2 if 15 kHz and 60 kHz coexist in the cell. The deriving would be performed by the transmitter and the receiver in the same way.

However, the present disclosure is not limited thereto. Further configurations may be defined by specifying the numbers of muted subcarriers.

Moreover, the configurations may, in addition to or alternative to ZP REs, specify the location of the resource elements for carrying reference signals or for carrying data. Here, the reference signals may be either non-zero RS used for channel estimation and zero-power RS used for inter-cell interference estimation.

Instead of providing the configurations in the standard, a plurality of configurations may be signaled semi-statically, for instance within the system information. System information may be broadcast in a cell and provided to a group of terminals. However, there may be also a dedicated UE signaling providing a set of configurations.

A mixture of configurations specified in a standard and configurations semi-statically signaled is also possible.

Once the plurality of configurations is known to a receiver, the receiver may be dynamically configured to select one from the plurality of configurations. For instance, a layer 1 (physical layer) group broadcast channel, e.g., group common Physical Downlink Control Channel (PDCCH), can be used to dynamically activate one of the ZP RE configurations and/or to deactivate the usage of the ZP REs for a particular numerology scheme within certain frequency range to a group of UEs. In 3GPP, it has been agreed that NR supports a group common PDCCH carrying at least slot format related information. The detailed design of group common PDCCH is still open currently. Note that common does not necessarily imply common per cell. Also, the term group common PDCCH refers to a channel (either a PDCCH or a separately designed channel) that carries information intended for the group of UEs. Slot format related information and defined as information from which the UE can derive at least which symbols in a slot that are DL, UL (for Rel-15), and other, respectively. The UE will have the possibility to determine whether some blind decodings can be skipped based on information on a group common PDCCH (if present).

PDCCH is a term typically used in connection with LTE/NR technology. However, it is noted that any physical layer (L1) channel for carrying control data may be employed in general.

Comparing to UE-specific signaling, signaling overhead by group broadcasting is reduced. The group of UEs may be formed with UEs that use the same numerology for reception of data within certain frequency range. A plurality of such groups supporting different numerologies may be formed and then the L1 group broadcast channel may be effectively used to signal the configuration of ZP REs to the members (reception devices) of the group. The term "dynamically" here means that the configuration can be modified every data scheduling interval, e.g., via Downlink Control Information (DCI). DCI may be carried by the PDCCH. In some systems such as LTE, PDCCH may be monitored by the terminals to determine whether there are data allocated to them.

The present disclosure is not limited to group based signaling. Rather, UE-specific signaling may be applied as an alternative, or in addition to the group based/broadcast signaling. Some CSI reporting UEs need to know ZP RE configuration. This information can be included in a CSI configuration message. PDSCH receiving UE may be required to know ZP REs for proper decoding. DCI indicates PDSCH REs of affected symbols. This facilitates flexible configuration of additional ZP REs.

Above, a combination of semi-static signaling of a set of configurations and a dynamic selection of a particular configuration from the set have been mentioned. However, as an alternative, the set of configurations may be defined in the standard and the selection among the defined combinations may be performed semi-statically, for instance using a dedicated signaling (only designated to a particular terminal).

Figure 11:
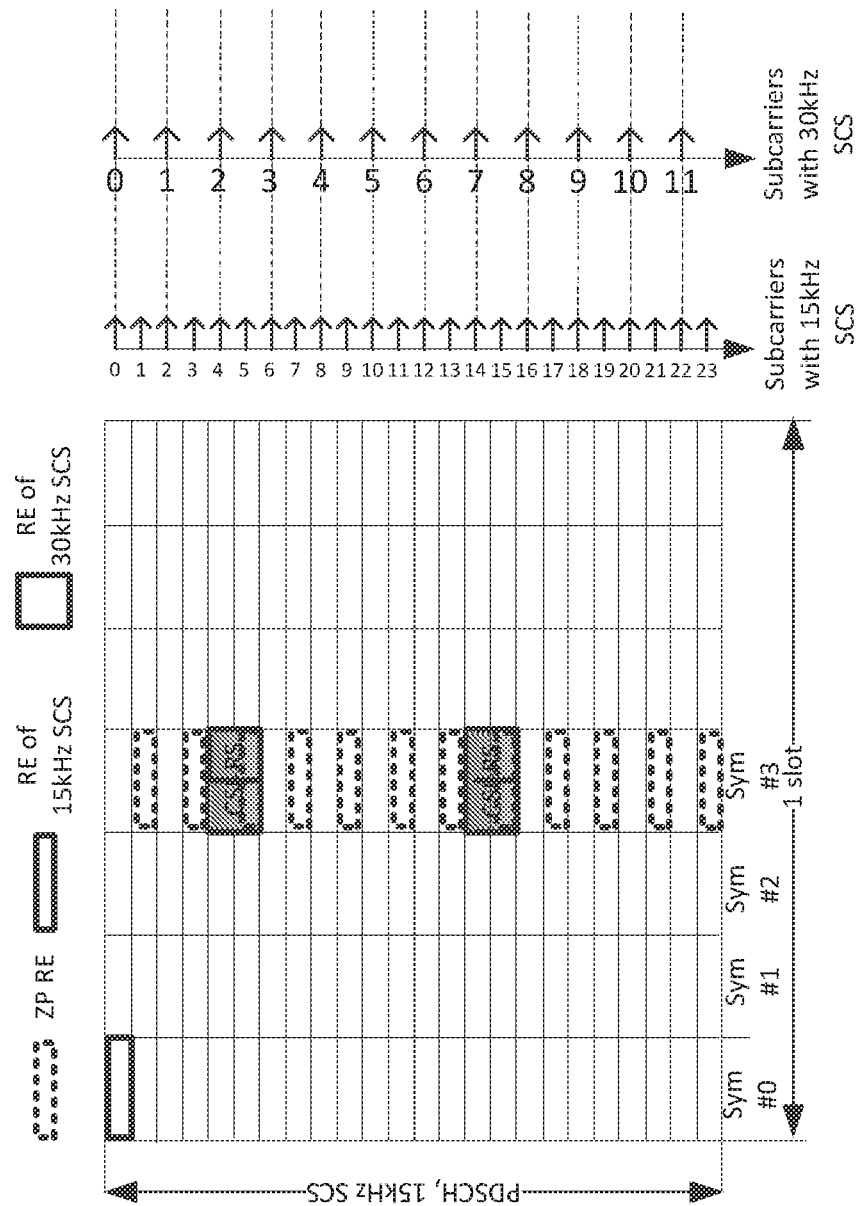
FIG. 11 is a schematic drawing illustrating an example in which data are transmitted using 15 kHz SCS and reference signal is transmitted using 30 kHz SCS.
Figure 12:
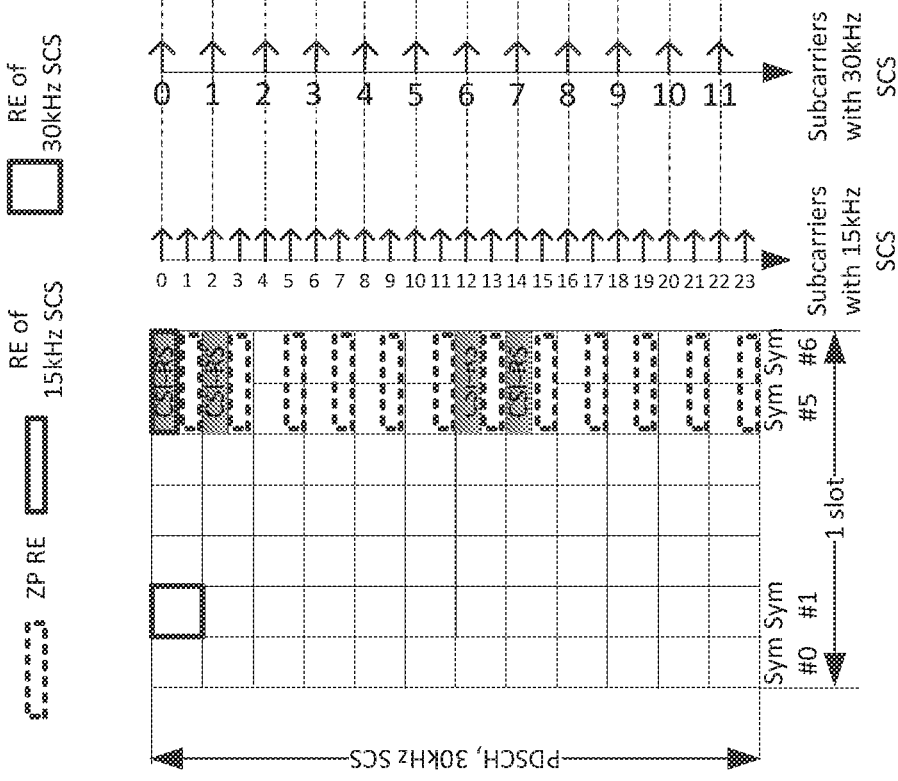
FIG. 12 is a schematic drawing illustrating an example in which data are transmitted using 30 kHz SCS and reference signal is transmitted using 15 kHz SCS.

Examples for allocating no transmit power to non-inter-numerology-orthogonal subcarriers of the second numerology are shown in FIGS. 11 and 12. In the figures, resource elements to which no power is allocated ("zero power"/ZP REs), are illustrated by means of dash dotted boxes. In both figures, the first numerology has a subcarrier spacing of 30 kHz, and the second numerology has a subcarrier spacing of 15 kHz. As can be seen, no transmit power is allocated to resource elements on subcarriers of the second numerology (in symbol #3 of the slot shown in FIG. 11 and in symbols

5, #6 of the slot shown in FIG. 12). In particular, no transmit power is allocated to any of the non-orthogonal subcarriers (subcarriers #1, #3, #5, . . . ) of the second numerology with the 15 kHz subcarrier spacing.

In FIGS. 11 and 12, data are to be transmitted on the PDSCH, and reference signals correspond to CSI-RS (channel state information reference signals). In both figures, data and reference signals are mapped onto subcarriers of respectively different numerologies of the first numerology and the second numerology.

In FIG. 11, the data are allocated to the resource elements corresponding to the numerology having 15 kHz subcarrier spacing. The Reference signals are allocated to the resource elements corresponding to the numerology having 30 kHz subcarrier spacing. In FIG. 12, on the other hand, the data are allocated to the resource elements corresponding to the numerology having 30 kHz subcarrier spacing, and the reference signals are allocated to the resource elements of the numerology having 15 kHz subcarrier spacing.

As an example, the circuitry 430 of the transmission device 410 shown in FIG. 4, may assign or allocate a reference signal to a subcarrier of the first numerology and/or to an inter-numerology-orthogonal subcarrier of the second numerology. On the side of the reception device 460, the reference signal may be received by the receiver 470, and the circuitry 480 may perform a channel measurement based on the reference signal.

In FIG. 11, in symbol #3 where the reference signal is allocated, the non-orthogonal subcarriers in the numerology with 15 kHz subcarrier spacing (the second numerology), namely subcarriers #1, #3, #5, . . . , are muted, i.e., no transmit power is allocated to these subcarriers. These subcarriers are not used by any physical channel, including the PDSCH, on which data are transmitted. However, a physical channel can be rate matched, e.g., padded or punctured around these resource elements to which no power is allocated. In other words, the length of the data to be mapped onto the resources may be adapted to match the number of resource elements remaining after reserving the zero-power resource elements and reference signal resources.

On the other hand, the transmission device may choose any subcarriers of the numerology with the 30 kHz subcarrier spacing (the first numerology) to transmit reference signals, because subcarriers to which no transmit power is allocated do not correspond to any subcarrier of the first numerology. For example, in FIG. 11, subcarrier #2 and subcarrier #7 of the first numerology are chosen for the transmission of the reference signals. In this case, the transmitting device may choose whether or not data is mapped to the subcarriers #4 and #14 of the second numerology, which are inter-numerology-orthogonal centrally aligned with subcarriers #2 and #7 of the first numerology. If the superimposition is not used, there will be no inter-numerology interference because of the configuration of zero power resource elements, or, in other words, because of the location of no transmit power to non-inter-numerology-orthogonal subcarriers. In some application scenarios, superimposition of data and CSI-RS could be beneficial because it improves the resource utilization. With ZP RE configured, the inter-numerology interference will only occur over the superimposed REs. Therefore, it is possible for the receiver equipped with interference cancellation capability to handle the reduced interference.

By superimposition, the scenario is referred to in which transmission power is assigned to two subcarriers which are mutually centrally aligned and belong to two different numerologies.

As shown in FIG. 11, data is mapped onto the subcarriers of one numerology, and reference signals are mapped onto the subcarriers of the other numerology. However, in addition to data, the circuitry 430 may further a reference signal such as a CSI-RS onto the subcarriers onto which the data are mapped. A mapping of a CSI-RS onto respective subcarriers a first and a second numerology allows for channel measurements with regard to both numerologies.

In the example shown in FIG. 12, the data are allocated to the resources of the numerology with 30 kHz subcarrier spacing, and the reference signals are transmitted to the resources of the numerology with the 15 kHz subcarrier spacing. As shown in the figure, reference signals are allocated to resource elements collocated with symbols #5 and #6 of the shown time slot. A symbol carrying a reference signal corresponds to two symbols of the shown slot because the numbering of symbols corresponds to the first numerology associated with the data transmission, the symbol length of which differs from the symbol length of the second numerology. In the example, the reference signals are allocated to the subcarriers #0, #2, #12, and #14 of the second numerology. However, they could be allocated to any inter-numerology-orthogonal subcarriers of the second numerology, such as #4, #6, or #16, provided that they are not allocated to non-inter-numerology-orthogonal subcarriers, namely subcarriers #1, #3, #5, . . . #13, #15, . . . , of the second numerology. Every one of these non-inter-numerology-orthogonal subcarriers, which correspond to every second subcarrier of the second numerology, are configured as zero power subcarriers, as in the example shown in FIG. 11. Accordingly, any physical channel or signal, in this example non-zero-power reference signals, should avoid the zero power resource elements corresponding to the non-inter-numerology-orthogonal subcarriers. However, the transmitting device may choose any subcarriers of the first numerology with 30 kHz subcarrier spacing for data transmission on the physical channel. As is the case for the example of FIG. 11, no inter-numerology interference occurs as long as data is not superimposed on reference signals, in particular non-zero power reference signals.

In the above description relating to FIGS. 11 and 12, examples of configurations have been provided in which no transmit power is allocated to non-inter-numerology-orthogonal subcarriers. With zero power resource elements accordingly configured, the inter-numerology-orthogonal subcarriers can be allocated among data and reference signals including zero power reference signals and non-zero power reference signals. Such a configuration facilitates channel estimation, interference measurement, and data transmission.

In particular, channel estimation relying on nonzero power reference signals will not be interfered by the underlying physical channel, i.e., the data transmitted on the physical channel using the numerology different from the numerology to which the nonzero power resource elements are allocated. Furthermore, if inter-numerology interference is sufficiently reduced by allocating no transmit power to non-inter-numerology-orthogonal subcarriers, interference measurement is allowed to reflect inter-cell interference without inter-numerology interference. Moreover, the data transmission is protected from inter-numerology interference.

Figure 13:
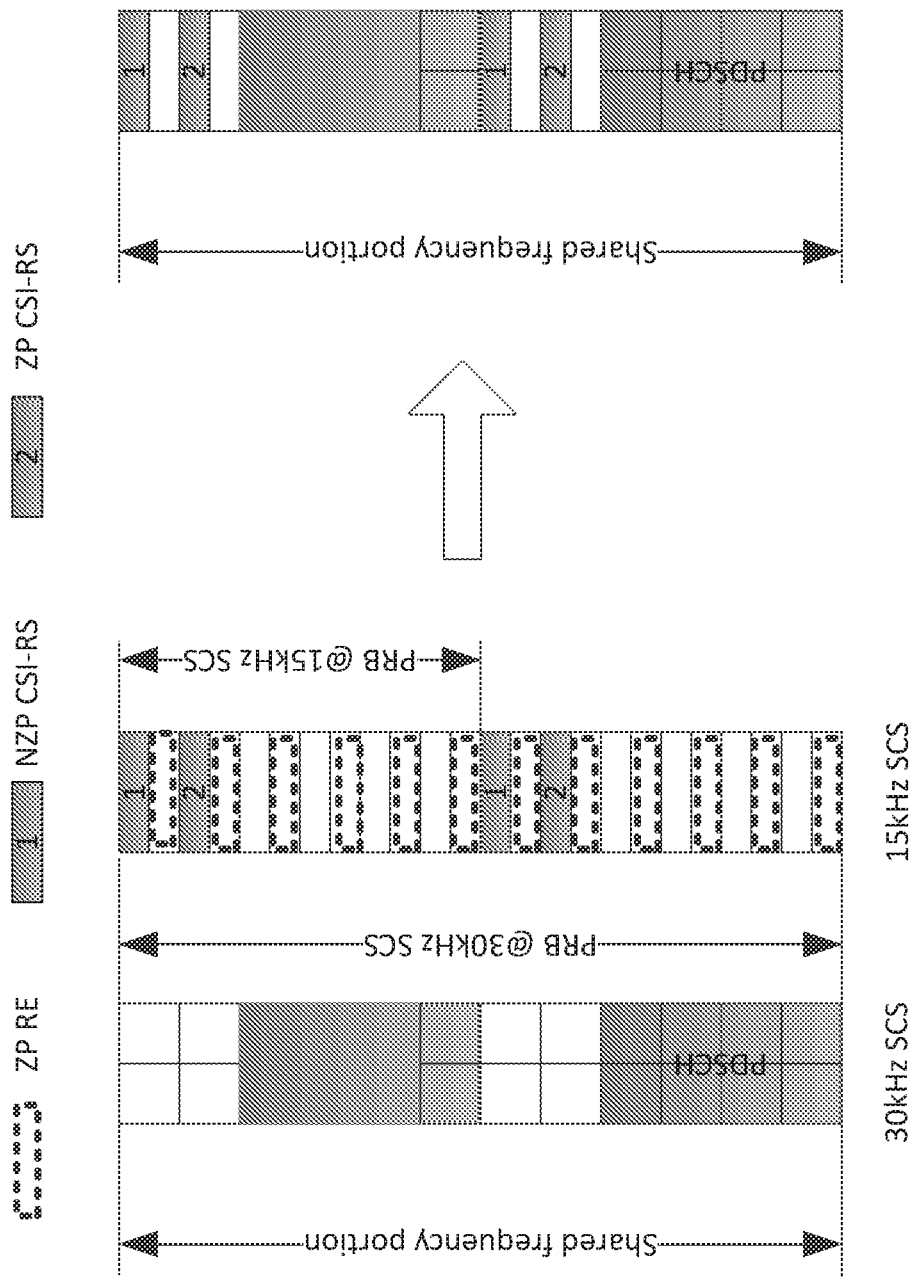
FIG. 13 is a schematic drawing illustrating an example in which inter-numerology-orthogonal subcarriers are allocated among zero/non-zero reference signals and data for different numerologies.

Specifically, the avoidance of inter-numerology interference facilitates sharing of the same frequency portion by data and reference signals used for different purposes. This is shown in FIG. 13. In the figure, physical channel data (in this example labeled "PDSCH"), is allocated to subcarriers of the first numerology with 30 kHz subcarrier spacing. On the non-inter-numerology-orthogonal subcarriers of the second numerology with 15 kHz subcarrier spacing, no transmit power is allocated, as described above. Furthermore, different reference signals, namely nonzero power reference signals (labeled "1") and zero power reference signals (labeled "2") are allocated to certain inter-numerology orthogonal subcarriers of the second numerology. As mentioned, for instance, the reception device aimed for CSI reporting can be configured with non-zero-power (NZP) over the inter-numerology-orthogonal subcarriers for channel measurement. Additionally, the reception device aimed for CSI reporting can be configured with one or more zero power CSI reference signals distributed over the inter-numerology-orthogonal subcarriers for inter-cell interference measurement.

The number of subcarriers to which channel state information reference signals are allocated can be reduced by spanning the reference signals over more than one OFDM symbols. This allows more subcarriers to be allocated for data transmission in order to, e.g., to fulfill the low latency requirement of URLLC services. For instance, in FIG. 14, a configuration is shown in which the first numerology has a subcarrier spacing of 60 kHz, and the second numerology is a subcarrier spacing of 15 kHz. Data is allocated to the subcarriers of the first numerology, and reference signals including both nonzero power reference signals and zero power reference signals are allocated to the inter-numerology-orthogonal subcarriers of second numerology corresponding to every fourth subcarrier of the second numerology. The reference signals are allocated to resource elements of one symbol of the second numerology. To every third subsequent inter-numerology-orthogonal subcarrier, a nonzero power reference signal is allocated and to every third subsequent inter-numerology-orthogonal subcarrier, a zero power reference signal is allocated. Accordingly, no reference signal is allocated every third inter-numerology-orthogonal subcarrier. Thus, if superimposition of reference signals on subcarriers of the second numerology and data on subcarriers of the first numerology is to be avoided, data can be allocated only to every third subcarrier of the first numerology.

Figure 14:
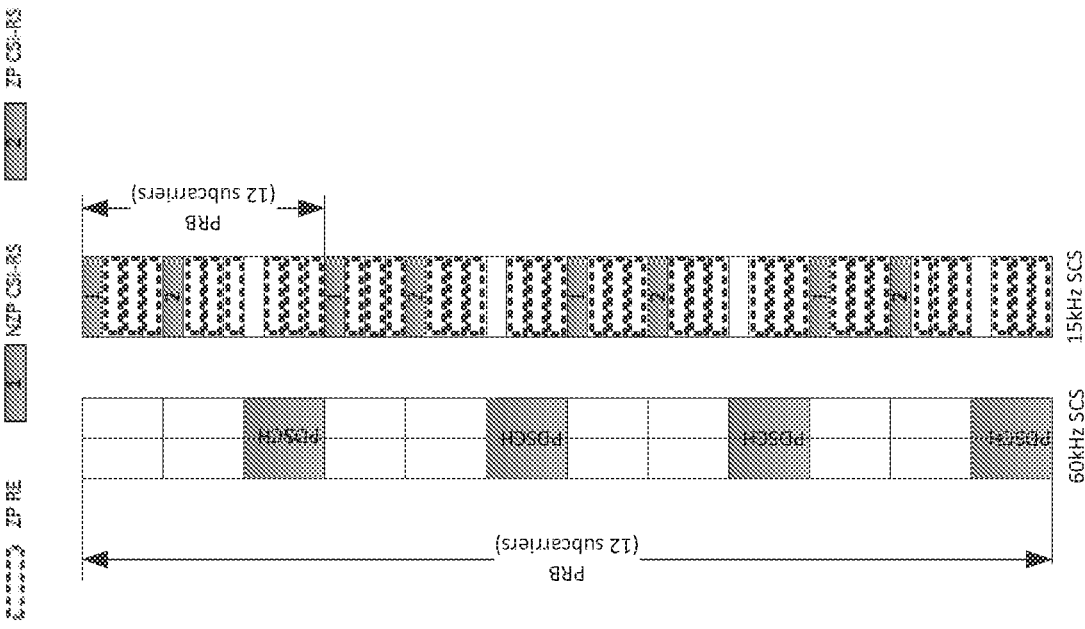
FIG. 14 is a schematic drawing illustrating an example in which zero/non-zero reference signals are mapped on one OFDM symbol.
Figure 15:
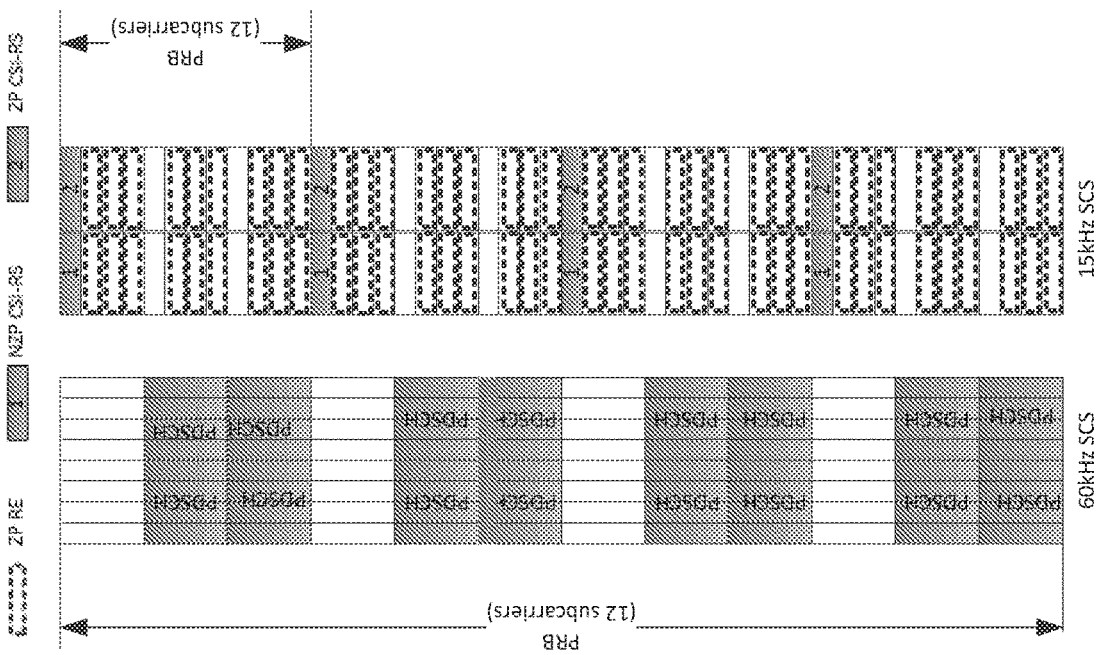
FIG. 15 is a schematic drawing illustrating an example in which zero/non-zero reference signals are mapped on one two symbols.

In FIG. 15, a configuration is shown in which the first and the second numerologies have the same respective subcarrier spacings as in FIG. 14. However, the circuitry 430 of the transmission device assigns reference signals to two subsequent symbols in the time domain. In particular, the reference signals are spend over two subsequent OFDM symbols of the second numerology. In this example, the duration of the two subsequent OFDM symbols of the second numerology corresponds to the duration of eight subsequent OFDM symbols of the first numerology. Nonzero power reference signals are allocated to resource elements of the first of the two OFDM symbols of the second numerology, i.e., the OFDM symbol which is transmitted earlier. Zero power reference signals are allocated to resource elements of the second of the two OFDM symbols of the second numerology. However, the same subcarrier can be used for the allocation of nonzero power reference signals and zero power reference signals. In contrast to the configuration shown in FIG. 14, reference signals are allocated only to every third subcarrier of the second numerology. Accordingly, if superimposition of data and reference signals is not desired, two out of three subcarriers of the first numerology can still be used for the location of the data, rather than one out of three subcarriers.

In the above example, the reference signals have been mapped onto resource elements of two symbols in order to provide more flexibility for mapping data on a co-existing numerology. However, the present disclosure is not limited thereto. The flexibility may further be increased by mapping the reference signals on more than two symbols in the time domain (OFDM symbols/SC-FDMA). The two symbols on which the reference signals are mapped in FIG. 14 are adjacent. However, in general, the reference signals may be mapped on more than one symbols which are not necessarily adjacent.

As can be seen in FIGS. 13 to 15, zero power CSI reference signals are configured within the inter-numerology-orthogonal subcarriers of the second numerology having both inter-numerology-orthogonal subcarriers and non-inter-numerology-orthogonal subcarriers. This facilitates measuring inter-cell interference only. However, zero power CSI can also be configured within the zero power resource elements. This facilitates measuring inter-cell interference plus inter-numerology interference. Because zero power CSI reference signals can be allocated to both inter-numerology-orthogonal subcarriers and to zero power resource elements configured within non-inter-numerology-orthogonal subcarriers, the configuration of interference measurement resources (IMR) is independent of zero power resource element configuration. In contrast, in LTE rel-10 and later releases of LTE, IMR is a subset of zero power CSI reference signals. The current disclosure provides more flexibility for the configuration of interference measurement resources.

Alternatively or additionally, nonzero power CSI reference signals can be used for interference measurement. To measure inter-cell interference, nonzero power CSI reference signal can be configured within the inter-numerology-orthogonal subcarriers of the second numerology. The interference is measured as the residual after the power of the reference signals are subtracted from the received signal.

In the case where numerologies for data and reference signals are mixed at an RE level, the proposed scheme which makes use of inter-numerology-orthogonality allows channel estimation, data transmission and inter-cell interference measurement without inter-numerology interference or with reduced inter-numerology interference.

Zero Power Between Numerologies

Optionally, the configuration of the zero power resource elements relying on inter-numerology-orthogonal subcarriers can completely cancel the inter-numerology interference. However, the price for such an efficient cancellation of inter-numerology interference may be that a large amount of subcarriers cannot be utilized for the transmission and reception of data and reference signals.

In some cases, it may be sufficient that the inter-numerology interferences are reduced rather than completely avoided. Thus, the above discussed zero power RE allocation may be applied to only some of the non-inter-numerology-orthogonal sub carriers.

Thus, the circuitry may assign transmit power to at least one subcarrier located between a subcarrier of the first numerology and a subcarrier of the second numerology.

In an exemplary embodiment, the circuitry 430 of a transmission device 410 may allocate data and/or a reference signal to a subcarrier or of the first numerology, and the circuitry 430 may allocate data and/or a reference signal to a subcarrier of the second numerology. Further, circuitry 430 may allocate no transmit power to a subcarrier between the subcarrier of the first numerology and the subcarrier of the second numerology. The subcarrier to which no transmit power is allocated may be a subcarrier of the first numerology or a subcarriers of the second numerology. If the subcarrier to which no transmit power is allocated is a subcarrier of the second numerology having inter-numerology-orthogonal subcarriers and non-inter-numerology-orthogonal subcarriers, no transmit power may be allocated to an inter-numerology-orthogonal subcarrier or a non-inter-numerology-orthogonal subcarrier between the subcarrier of the first numerology and the subcarrier of the second numerology to which data and or a Reference Signal are allocated.

In other words, the configuration of zero power resource elements according to the exemplary embodiment does not obey the rule of allocating no transmit power to all non-inter-numerology-orthogonal subcarriers. For instance, at least two subcarriers contiguous in frequency may be muted when different numerologies are frequency multiplexed in RE level.

Figure 16:
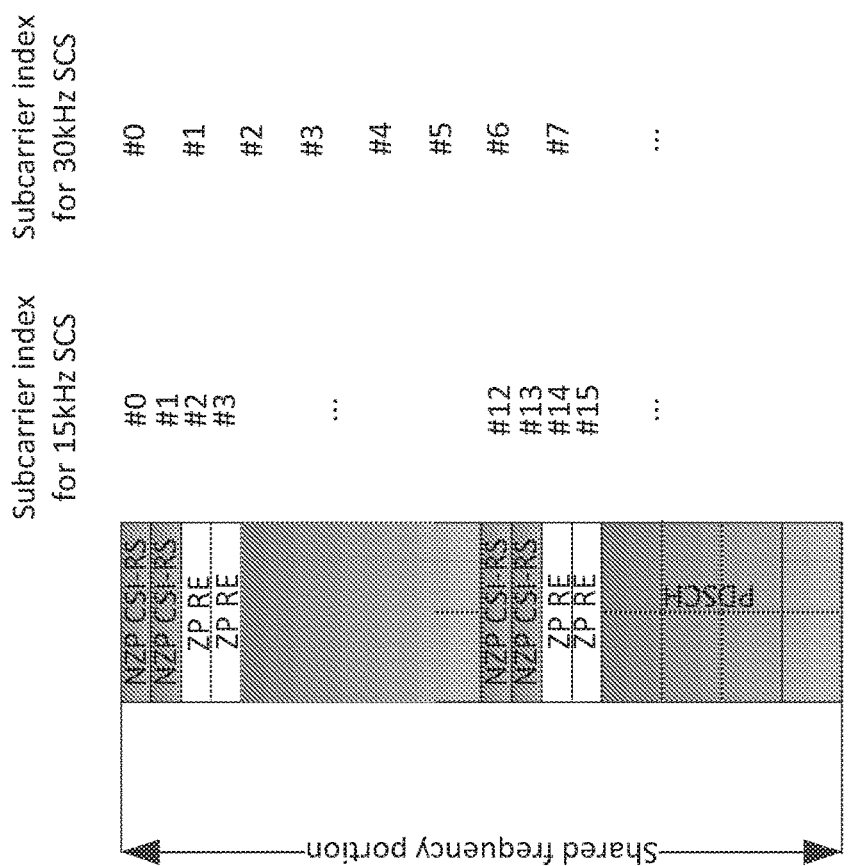
FIG. 16 is a schematic drawing illustrating an example of a thereof in which the inter-numerology interference is reduced but some non-inter-numerology-orthogonal subcarriers are assigned non-zero power.

An example of a configuration of data, reference signals, and zero power resource elements according to the present embodiment is shown in FIG. 16. The figure illustrates a frequency portion shared by the first numerology and the second numerology. Reference signals are allocated to subcarriers of the second numerology having a smaller subcarrier spacing of 15 kHz. Data are allocated to subcarriers of the first numerology having greater subcarrier spacing, namely 30 kHz. Reference signals are allocated to subcarriers #0 and #1 of the second numerology, and data are allocated to subcarriers #3 to #6. Zero power resource elements are allocated to subcarriers #2 and #3 of the second numerology. In other words, no transmit power is allocated to subcarriers #2 and #3 of the second numerology between the subcarriers of the first numerology on which data transmitted and received, and the subcarriers of the second numerology on which reference signals are transmitted and received.

The same configuration of reference signals, data and resource elements which has been described above with respect to subcarriers #0 to #3 of the second numerology and subcarriers #2 to #5 of the first numerology is repeated on subcarriers #12 to #15 of the second numerology and subcarriers #8 to #11 of the first numerology. In the configuration shown in FIG. 16, the reference signal allocated to subcarrier #12 of the second numerology and the data allocated to subcarrier #5 of the first numerology are transmitted on directly adjacent subcarriers, which means that there is an occurrence of subcarriers of different numerologies with reference signal(s) and data, which have no zero-power resource element between them.

However, the present disclosure is not limited to the configuration as shown in FIG. 16. Alternatively, zero power resource elements may be adjacent to an occurrence of contiguous reference signals on both sides to separate the reference signals transmitted using the second numerology from the data transmitted using the first numerology. Furthermore, data may also be transmitted using the second numerology, and reference signals may be transmitted using the first numerology.

According to an exemplary embodiment, not all non-inter-numerology-orthogonal subcarriers of the second numerology necessarily need to be muted. For instance, as can be seen in FIG. 16, nonzero power reference signals are allocated to subcarrier #1 as well as subcarrier #13 of the second numerology. However, if one or more non-inter-numerology-orthogonal subcarrier(s) reserved for the allocation of no transmit power, inter-numerology-interference still reduced. This reduction of inter-numerology interference can still be achieved if there are non-inter-numerology-orthogonal subcarriers to which reference signals and/or data are allocated instead not allocating transmit power to any non-into numerology-orthogonal subcarriers.

Furthermore, if allocation of data and/or reference signals in some non-inter-numerology-orthogonal subcarriers is allowed, the transmission device 410 may allocate data and/or resource elements to subcarriers of the first and the second numerology more flexibly. For instance, more subcarriers can be available for the transmission of data and or reference signals. Thus, a tradeoff between reduction of inter-numerology interference and available resources for transmission of data and reference signals may be achieved.

In particular, if the transmission device 410 capable of dynamic resource allocation, it may choose between partially allowing and completely permitting the allocation depending on current requirements which may change in time.

Although the reference signals shown in FIG. 16 are nonzero power CSI reference signals, the disclosure is not limited to such a configuration. For instance, a zero power reference signals, which can be used for inter-numerology interference measurements and other measurements, may be used instead of or in combination with a nonzero power CSI reference signal.

Inter-Cell Coordination

The devices and methods described so far allow for the mitigation of into numerology interference within one cell, if a transmission device 410 according to any of the above embodiments is used. However, the inter-numerology interference from a neighboring cell is treated by the respective cell of the transmission device 410 in the same way as inter-cell interference.

If there is no inter-cell coordination, this reflects the actual interference on the data channel, because the resource allocation to different numerologies for the data channel is independent within each cell. Even if inter-numerology interference can be sufficiently reduced within the cell for which the respective serving transmission device (base station) allocates the resources, still the inter-numerology interference from a neighboring cell will contribute to the inter-cell interference.

However, if inter-cell coordination is operated, the scheduler can coordinate the resource allocation for the data channel in the neighboring cell such that the same frequency portion is used for the same numerology scheme across cells, to avoid into numerology interference.

Accordingly, the configuration of zero power resource elements may be coordinated among neighboring cells. Neighboring cells should share information about the supported numerology's within a certain bandwidth and about the activated pattern of zero power resource elements.

In an exemplary embodiment, the transmission device 410 serves a first cell in a cellular communication system. The circuitry of the transmission device 410 receives second-cell configuration information indicating at least one numerology supported by a second cell (e.g., a neighboring cell) and indicating a configuration of the resource elements of the at least one numerology to which no transmit power is assigned. For instance, the second-cell configuration information may indicate subcarriers of a third and a fourth numerology to which a second transmission device serving the second cell maps reference signals and/or data. The second-cell configuration information may further indicate subcarriers of the third and/or fourth numerology to which no transmit power is allocated.

Further, the circuitry 430 of the transmission device 410 may adapt the assignment of no transmit power to the at least one subcarrier in accordance with the received second-cell configuration information.

If a neighboring cell is handled by a different transmission device than the transmission device 410 handling the respective cell, the two transmission devices may be directly connected by means of an interface, which may for instance be a wireless interface or a wired interface. The coordination information can then be conveyed by the interface between the transmission devices.

Alternatively, the transmission devices handling the different cells may have respective interfaces to a controller rather than being connected to each other by means of an interface.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to one general aspect, a transmission device comprising circuitry which, in operation, maps data and/or a reference signal onto resources of a communication system, the resources including subcarriers of a first numerology and a second numerology, wherein the first numerology and the second numerology differ at least by subcarrier spacing and the subcarriers of the first and the second numerologies are frequency-multiplexed on a subcarrier basis. The transmission device may further comprise a transmitter which, in operation, transmits the mapped reference signal and/or data, wherein the circuitry, in operation, assigns no transmit power to at least one subcarrier located between a subcarrier of the first numerology and a subcarrier of the second numerology.

For example, the circuitry, in operation, maps the data to the subcarriers of one of the first and second numerologies, and maps the reference signal onto the respective other numerology of the first and second numerologies.

In some embodiments, the subcarriers of the first numerology are orthogonal to each other. Moreover, the subcarriers of the second numerology comprise (i) inter-numerology-orthogonal subcarriers, each of which is centrally aligned with a subcarrier of the first numerology, and (ii) non-inter-numerology-orthogonal subcarriers not centrally aligned with any subcarrier of the first numerology and located between two adjacent subcarriers of the first numerology. Furthermore, the circuitry, in operation, assigns no transmit power to at least one of the non-inter-numerology-orthogonal sub carriers.

According to some embodiments, the circuitry, in operation, assigns the reference signal to a subcarrier of the first numerology and/or to an inter-numerology-orthogonal subcarrier of the second numerology.

According to some embodiments, the circuitry, in operation, assigns no transmit power to any of the non-inter-numerology-orthogonal subcarriers between two adjacent subcarriers of the first numerology.

For example, the resources include symbols in a time domain, and the circuitry, in operation, assigns reference signals to two subsequent symbols. The reference signal may be a zero-power reference signal.

In some embodiments, the circuitry, in operation, assigns transmit power to at least one non-inter-numerology-orthogonal subcarrier.

In some embodiments, the circuitry assigns no transmit power to any subcarriers located between two adjacent subcarriers of the numerology with the greatest subcarrier spacing.

In some embodiments, the communication system is a cellular system, the transmission device serves a first cell, and the circuitry, in operation, receives second-cell configuration information indicating at least one numerology supported by a second cell and/or indicating a configuration of the resource elements of the at least one numerology to which no transmit power is assigned.

For instance, the circuitry in operation adapts the assignment of no transmit power to the at least one subcarrier in accordance with the received second-cell configuration information.

In some embodiments, the circuitry, in operation, generates control information indicating to which at least one subcarrier no transmit power is allocated, and the transmitter, in operation, transmits the generated control information.

For instance, the control information specifies at least one subcarrier to which: no transmit power is allocated; the reference signal is allocated; non-zero power can be allocated.

The transmitter may transmit the control information via semi-static signaling, in particular system information.

For example, the control information is transmitted via dynamic signaling indicating activation or deactivation of a particular zero power configuration for a numerology.

According to one general aspect, a reception device is provided comprising: a receiver, which, in operation, receives data and/or a reference signal in resources of a communication system; circuitry, which, in operation, de-maps the data and/or the reference signal from the resources which include subcarriers of a first numerology and subcarriers of a second numerology, wherein the first numerology and the second numerology differ at least by subcarrier spacing and the subcarriers of the first and the second numerologies are frequency-multiplexed on a subcarrier basis, wherein the receiver, in operation, receives control information to derive to which subcarriers no transmit power is allocated, and no transmit power is allocated to at least one subcarrier located between a subcarrier of the first numerology and a subcarrier of the second numerology.

According to some embodiments, the subcarriers of the first numerology are orthogonal to each other, the subcarriers of the second numerology comprise inter-numerology-orthogonal subcarriers, each of which is centrally aligned with a subcarrier of the first numerology, and non-inter-numerology-orthogonal subcarriers not centrally aligned with any subcarrier of the first numerology and located between two adjacent subcarriers of the first numerology. Moreover, the reception device assigns no transmit power to at least one of the non-inter-numerology-orthogonal subcarriers.

According to some embodiments, the reference signal is allocated to a subcarrier of the first numerology and/or to an inter-numerology-orthogonal subcarrier of the second numerology and the circuitry, in operation, performs a channel measurement based on the reference signal.

One general aspect relates to a transmission method to be performed by a transmission device and comprising the steps of: mapping data and/or a reference signal onto resources of a communication system, the resources including subcarriers of a first numerology and a second numerology, wherein the first numerology and the second numerology differ at least by subcarrier spacing and the subcarriers of the first and the second numerologies are frequency-multiplexed on a subcarrier basis, and transmitting the mapped reference signal and/or data, wherein, in the step of transmitting the data and/or a reference signal onto the resources, no transmit power is assigned to at least one subcarrier located between a subcarrier of the first numerology and a subcarrier of the second numerology.

One general aspect relates to reception method to be performed by a reception device comprising the steps of: receiving data and/or a reference signal in resources of a communication system, and de-mapping the data and/or the reference signal from the resources which include subcarriers of a first numerology and subcarriers of a second numerology, wherein the first numerology and the second numerology differ at least by subcarrier spacing and the subcarriers of the first and the second numerologies are frequency-multiplexed on a subcarrier basis, wherein, in the step of receiving data and/or control information, control information is received to derive to which subcarriers no transmit power is allocated, and no transmit power is allocated to at least one subcarrier located between a subcarrier of the first numerology and a subcarrier of the second numerology.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transmission device, comprising:
   circuitry which, in operation, maps data or a reference signal onto resources of a communication system, the resources including subcarriers of a first numerology and a second numerology, wherein the first numerology and the second numerology differ at least by subcarrier spacing and the subcarriers of the first and the second numerologies are frequency-multiplexed on a subcarrier basis; and
   a transmitter which, in operation, transmits the mapped data or reference signal,
   wherein:
      the circuitry, in operation, assigns no transmit power to at least one subcarrier located between a subcarrier of the first numerology and a subcarrier of the second numerology,
      the subcarriers of the first numerology are orthogonal to each other;
      the subcarriers of the second numerology include:
         inter-numerology-orthogonal subcarriers, each of which is centrally aligned with a subcarrier of the first numerology, and
         non-inter-numerology-orthogonal subcarriers not centrally aligned with any subcarrier of the first numerology and located between two adjacent subcarriers of the first numerology; and
      the circuitry, in operation, assigns no transmit power to at least one of the non-inter-numerology-orthogonal subcarriers.

2. The transmission device according to claim 1, wherein:
   the circuitry, in operation, maps the data to the subcarriers of a first one of the first and second numerologies; and
   maps the reference signal onto a second one of the first and second numerologies; and
   wherein the first one of the first and second numerologies is different from the second one of the first and second numerologies.

3. The transmission device according to claim 1, wherein the circuitry, in operation, assigns the reference signal to a subcarrier of the first numerology or to an inter-numerology-orthogonal subcarrier of the second numerology.

4. The transmission device according to claim 1, wherein the circuitry, in operation, assigns no transmit power to any of the non-inter-numerology-orthogonal subcarriers between two adjacent subcarriers of the first numerology.

5. The transmission device according to claim 1, wherein:
   the resources include symbols in a time domain; and
   the circuitry, in operation, assigns reference signals to more than one subsequent symbols.

6. The transmission device according to claim 1, wherein the reference signal is a zero-power reference signal.

7. The transmission device according to claim 1, wherein the circuitry, in operation, assigns transmit power to at least one non-inter-numerology-orthogonal subcarrier.

8. The transmission device according to claim 1, wherein the circuitry assigns no transmit power to any subcarriers located between two adjacent subcarriers of the numerology with the greatest subcarrier spacing.

9. The transmission device according to claim 1, wherein:
   the communication system is a cellular system, the transmission device serves a first cell; and
   the circuitry, in operation, receives second-cell configuration information indicating at least one numerology supported by a second cell or indicating a configuration of the resource elements of the at least one numerology to which no transmit power is assigned.

10. The transmission device according to claim 9, wherein the circuitry in operation adapts the assignment of no transmit power to the at least one subcarrier in accordance with the received second-cell configuration information.

11. The transmission device according to claim 1, wherein:
the circuitry, in operation, generates control information indicating the at least one subcarrier to which no transmit power is allocated, and
the transmitter, in operation, transmits the generated control information.

12. The transmission device according to claim 11, wherein the control information specifies at least one subcarrier to which: no transmit power is allocated; or the reference signal is allocated; or non-zero power can be allocated.

13. The transmission device according to claim 11, wherein the transmitter transmits the control information via semi-static signaling, in particular system information.

14. The transmission device according to claim 11, wherein the control information is transmitted via dynamic signaling indicating activation or deactivation of a particular zero power configuration for a numerology.

15. A reception device, comprising:
a receiver, which, in operation, receives data or a reference signal in resources of a communication system; and
circuitry, which, in operation, de-maps the data or the reference signal from the resources which include subcarriers of a first numerology and subcarriers of a second numerology, wherein the first numerology and the second numerology differ at least by subcarrier spacing and the subcarriers of the first and the second numerologies are frequency-multiplexed on a subcarrier basis,
wherein:
the receiver, in operation, receives control information indicating one or more subcarriers to which no transmit power is allocated, and no transmit power is allocated to at least one subcarrier located between a subcarrier of the first numerology and a subcarrier of the second numerology;
the subcarriers of the first numerology are orthogonal to each other;
the subcarriers of the second numerology include:
inter-numerology-orthogonal subcarriers, each of which is centrally aligned with a subcarrier of the first numerology; and
non-inter-numerology-orthogonal subcarriers not centrally aligned with any subcarrier of the first numerology and located between two adjacent subcarriers of the first numerology; and
no transmit power is assigned to at least one of the non-inter-numerology-orthogonal subcarriers.

16. The reception device according to claim 15, wherein:
the reference signal is allocated to a subcarrier of the first numerology or to an inter-numerology-orthogonal subcarrier of the second numerology; and
the circuitry, in operation, performs a channel measurement based on the reference signal.

17. A transmission method performed by a transmission device, comprising:
mapping data or a reference signal onto resources of a communication system, the resources including subcarriers of a first numerology and a second numerology, wherein the first numerology and the second numerology differ at least by subcarrier spacing and the subcarriers of the first and the second numerologies are frequency-multiplexed on a subcarrier basis, and
transmitting the mapped data or reference signal,
wherein:
the transmitting includes transmitting the mapped data or reference signal with no transmit power assigned to at least one subcarrier located between a subcarrier of the first numerology and a subcarrier of the second numerology
the subcarriers of the first numerology are orthogonal to each other;
the subcarriers of the second numerology include:
inter-numerology-orthogonal subcarriers, each of which is centrally aligned with a subcarrier of the first numerology, and
non-inter-numerology-orthogonal subcarriers not centrally aligned with any subcarrier of the first numerology and located between two adjacent subcarriers of the first numerology; and
the transmitting includes transmitting the mapped data or reference signal with no transmit power assigned to at least one of the non-inter-numerology-orthogonal subcarriers.

18. A reception method performed by a reception device, comprising:
receiving data or a reference signal in resources of a communication system, and
de-mapping the data or the reference signal from the resources which include subcarriers of a first numerology and subcarriers of a second numerology, wherein the first numerology and the second numerology differ at least by subcarrier spacing and the subcarriers of the first and the second numerologies are frequency-multiplexed on a subcarrier basis,
wherein:
the receiving includes receiving control information indicating one or more subcarriers to which no transmit power is allocated, and no transmit power is allocated to at least one subcarrier located between a subcarrier of the first numerology and a subcarrier of the second numerology, and
the subcarriers of the first numerology are orthogonal to each other;
the subcarriers of the second numerology include:
inter-numerology-orthogonal subcarriers, each of which is centrally aligned with a subcarrier of the first numerology; and
non-inter-numerology-orthogonal subcarriers not centrally aligned with any subcarrier of the first numerology and located between two adjacent subcarriers of the first numerology; and
no transmit power is assigned to at least one of the non-inter-numerology-orthogonal subcarriers.

* * * * *